(12) United States Patent
Shirai et al.

(10) Patent No.: US 12,151,758 B2
(45) Date of Patent: Nov. 26, 2024

(54) ACTUATOR DEVICE AND RIDER-POSTURE CHANGING APPARATUS FOR HUMAN-POWERED VEHICLE

(71) Applicant: SHIMANO INC., Sakai (JP)

(72) Inventors: Toyoto Shirai, Sakai (JP); Yuki Sakagawa, Sakai (JP); Kiichiro Nagata, Sakai (JP)

(73) Assignee: SHIMANO INC., Sakai (JP)

( * ) Notice: Subject to any disclaimer, the term of this patent is extended or adjusted under 35 U.S.C. 154(b) by 117 days.

(21) Appl. No.: 17/952,303

(22) Filed: Sep. 25, 2022

(65) Prior Publication Data

US 2024/0101207 A1   Mar. 28, 2024

(51) Int. Cl.
| | | |
|---|---|---|
| *B62J 1/08* | (2006.01) | |
| *B62J 1/28* | (2006.01) | |
| *B62J 45/00* | (2020.01) | |

(52) U.S. Cl.
CPC . *B62J 1/08* (2013.01); *B62J 1/28* (2013.01); *B62J 45/00* (2020.02); *B62J 2001/085* (2013.01)

(58) Field of Classification Search
CPC . B62J 1/08; B62J 1/28; B62J 2001/085; B62J 45/00
See application file for complete search history.

(56) References Cited

U.S. PATENT DOCUMENTS

| | | | |
|---|---|---|---|
| 7,673,936 B2 | 3/2010 | Hsu | |
| 8,177,251 B2 | 5/2012 | Shirai | |
| 9,073,592 B2 | 7/2015 | Hsu | |
| 9,126,647 B2 | 9/2015 | Kuo | |
| 9,487,256 B2 | 11/2016 | Hsu | |
| 9,540,063 B1 | 1/2017 | Shirai | |
| 9,580,123 B2 | 2/2017 | Shirai | |
| 9,969,448 B1 | 5/2018 | Chen | |
| 10,131,391 B2 | 11/2018 | Shirai | |
| 10,472,012 B2 | 11/2019 | Shirai | |
| 10,604,201 B2 | 3/2020 | Shirai et al. | |
| 10,759,484 B2 | 9/2020 | Chen | |
| 10,766,561 B2 * | 9/2020 | Hara | B62M 25/08 |

(Continued)

FOREIGN PATENT DOCUMENTS

| | | |
|---|---|---|
| DE | 20 2015 104 354 U1 | 8/2015 |
| DE | 10 2018 102 955 | 8/2018 |
| EP | 2457811 B1 | 5/2012 |

OTHER PUBLICATIONS

Office Action with Form PTO-892 Notice of References Cited issued by the United States Patent and Trademark Office for the co-pending U.S. Appl. No. 16/737,829, filed Jul. 21, 2022.

*Primary Examiner* — Philip F Gabler

(74) *Attorney, Agent, or Firm* — MORI & WARD, LLP

(57) ABSTRACT

An actuator device for a rider-posture changing apparatus of a human-powered vehicle comprises a cam follower and a cam member. The cam member is rotatable about a rotational axis. At least one of the cam follower and the cam member includes a curved surface contactable with another of the cam follower and the cam member to move the cam follower in a movement direction in response to a rotation of the cam member. The movement direction is different from a circumferential direction defined about the rotational axis. The curved surface has a curved shape in a first cross-section perpendicular to the circumferential direction.

20 Claims, 23 Drawing Sheets

(56) References Cited

U.S. PATENT DOCUMENTS

| | | |
|---|---|---|
| 10,780,932 B2 | 9/2020 | Shirai |
| 11,548,580 B2 * | 1/2023 | Sakagawa ............. F16K 31/047 |
| 2012/0228906 A1 | 9/2012 | McAndrews et al. |
| 2016/0355225 A1 | 12/2016 | Shirai |
| 2017/0096184 A1 | 4/2017 | Hara et al. |
| 2017/0096186 A1 | 4/2017 | Lai |
| 2017/0225734 A1 | 8/2017 | Shirai |
| 2017/0341692 A1 | 11/2017 | Shirai |
| 2018/0186419 A1 | 7/2018 | Shipman et al. |
| 2018/0244330 A1 | 8/2018 | Shirai |
| 2019/0193802 A1 | 6/2019 | Hara et al. |
| 2019/0300085 A1 | 10/2019 | Shirai et al. |
| 2020/0079453 A1 | 3/2020 | Sakagawa et al. |
| 2020/0140029 A1 * | 5/2020 | Shipman ................... B62J 1/08 |
| 2021/0206443 A1 * | 7/2021 | Sakagawa ............. B62K 23/02 |

* cited by examiner

ACTUATOR DEVICE AND RIDER-POSTURE CHANGING APPARATUS FOR HUMAN-POWERED VEHICLE

BACKGROUND

Technical Field

The present invention relates to an actuator device and a rider-posture changing apparatus for a human-powered vehicle.

Background Information

A human-powered vehicle includes an actuation unit. The actuation unit includes a can and a follower. It is preferable to smoothen a relative movement between the cam and the follower.

SUMMARY

In accordance with a first aspect of the present invention, an actuator device for a rider-posture changing apparatus of a human-powered vehicle comprises a cam follower and a cam member. The cam member is rotatable about a rotational axis. At least one of the cam follower and the cam member includes a curved surface contactable with another of the cam follower and the cam member to move the cam follower in a movement direction in response to a rotation of the cam member. The movement direction is different from a circumferential direction defined about the rotational axis. The curved surface has a curved shape in a first cross-section perpendicular to the circumferential direction.

With the actuator device according to the first aspect, the curved surface can reduce stress applied between the cam follower and the cam member. This smoothens a relative movement between the cam follower and the cam member.

In accordance with a second aspect of the present invention, the actuator device according to the first aspect is configured so that the cam follower includes a first curved surface. The cam member is rotatable about a rotational axis. The cam member includes a second curved surface contactable with the first curved surface to move the cam follower in the movement direction in response to a rotation of the cam member. The first curved surface has a curved shape in the first cross-section. The second curved surface has a curved shape in the first cross-section.

With the actuator device according to the second aspect, the first curved surface and the second curved surface can reduce stress applied between the first curved surface and the second curved surface. This smoothens the relative movement between the cam follower and the cam member.

In accordance with a third aspect of the present invention, the actuator device according to the second aspect is configured so that the second curved surface extends along the circumferential direction about the rotational axis.

With the actuator device according to the third aspect, it is possible to move the cam follower in the movement direction by using the rotation of the cam member.

In accordance with a fourth aspect of the present invention, the actuator device according to the second or third aspect is configured so that the second curved surface spirally extends about the rotational axis.

With the actuator device according to the fourth aspect, it is possible to effectively move the cam follower in the movement direction by using the rotation of the cam member.

In accordance with a fifth aspect of the present invention, the actuator device according to any one of the second to fourth aspects is configured so that the cam member includes a cam groove defined by the second curved surface. The first curved surface is at least partially provided in the cam groove in a state where the first curved surface is in contact with the second curved surface.

With the actuator device according to the fifth aspect, the cam groove enables the position of the cam follower to be stable relative to the cam member.

In accordance with a sixth aspect of the present invention, the actuator device according to the fifth aspect is configured so that the cam groove extends along the circumferential direction about the rotational axis.

With the actuator device according to the sixth aspect, it is possible to smoothly move the cam follower in the movement direction by using the rotation of the cam member.

In accordance with a seventh aspect of the present invention, the actuator device according to the fifth or sixth aspect is configured so that the cam groove spirally extends about the rotational axis.

With the actuator device according to the seventh aspect, it is possible to more smoothly move the cam follower in the movement direction by using the rotation of the cam member.

In accordance with an eighth aspect of the present invention, the actuator device according to any one of the fifth to seventh aspects is configured so that the cam groove includes a first end and a second end and extends from the first end to the second end. The second curved surface extends from the first end to the second end.

With the actuator device according to the eighth aspect, it is possible to reduce stress applied between the first curved surface and the second curved surface in the cam groove extending from the first end to the second end. This reliably smoothens the relative movement between the cam follower and the cam member.

In accordance with a ninth aspect of the present invention, the actuator device according to any one of the second to eighth aspects is configured so that the first curved surface includes a convex curved shape.

With the actuator device according to the ninth aspect, it is possible to reliably maintain the contact between the first curved surface and the second curved surface.

In accordance with a tenth aspect of the present invention, the actuator device according to any one of the second to ninth aspects is configured so that the second curved surface includes a concave curved shape.

With the actuator device according to the tenth aspect, it is possible to stabilize the position of the cam follower relative to the cam member.

In accordance with an eleventh aspect of the present invention, the actuator device according to any one of the second to tenth aspects is configured so that the movement direction is defined along the rotational axis.

With the actuator device according to the eleventh aspect, it is possible to effectively move the cam follower in the movement direction by using the rotation of the cam member.

In accordance with a twelfth aspect of the present invention, the actuator device according to any one of the second to eleventh aspects is configured so that the cam follower includes an elongated part extending in the movement direction. The elongated part includes an end portion including the first curved surface.

With the actuator device according to the twelfth aspect, it is possible to save the space for the cam follower.

In accordance with a thirteenth aspect of the present invention, the actuator device according to any one of the second to twelfth aspects is configured so that the first curved surface includes a spherical surface. The second curved surface is contactable with the spherical surface to move the cam follower in the movement direction in response to the rotation of the cam member.

With the actuator device according to the thirteenth aspect, it is possible to reliably maintain the contact between the spherical surface and the second curved surface.

In accordance with a fourteenth aspect of the present invention, the actuator device according to any one of the second to thirteenth aspects is configured so that the first curved surface has a curved shape in a second cross-section perpendicular to a radial direction with respect to the rotational axis.

With the actuator device according to the fourteenth aspect, it is possible to reliably maintain the contact between the spherical surface and the second curved surface.

In accordance with a fifteenth aspect of the present invention, the actuator device according to any one of the second to fourteenth aspects is configured so that the cam follower extends in the movement direction. The cam follower includes an end portion including the first curved surface.

With the actuator device according to the fifteenth aspect, it is possible to save the space for the cam follower.

In accordance with a sixteenth aspect of the present invention, the actuator device according to any one of the second to fifteenth aspects further comprises a base member. The cam follower is movable relative to the base member in the movement direction. The cam member is rotatable relative to the base member about the rotational axis.

With the actuator device according to the sixteenth aspect, it is possible to support the cam follower and the cam member.

In accordance with a seventeenth aspect of the present invention, the actuator device according to any one of the second to sixteenth aspects further comprises an electric actuator coupled to the cam member to rotate the cam member about the rotational axis.

With the actuator device according to the seventeenth aspect, the electric actuator can rotate the cam member to move the cam follower in the movement direction using electricity.

In accordance with an eighteenth aspect of the present invention, a rider-posture changing apparatus for a human-powered vehicle comprises a first member, a second member, a state changing structure, and the actuator device according to any one of the first to seventeenth aspects. The first member extends in a longitudinal direction. The second member extends in the longitudinal direction. The first member and the second member are relatively movable in the longitudinal direction. The state changing structure is configured to change a state of the rider-posture changing apparatus. The actuator device is coupled to the state changing structure.

With the actuator device according to the eighteenth aspect, it is possible to apply the actuator device to the rider-posture changing apparatus.

In accordance with a nineteenth aspect of the present invention, the actuator device according to the eighteenth aspect is configured so that the state changing structure is configured to change the state of the rider-posture changing apparatus between a first state where the first member and the second member are restricted from moving relative to each other, and a second state where the first member and the second member are relatively movable in the longitudinal direction.

With the actuator device according to the nineteenth aspect, it is possible to change the state of the rider-posture changing apparatus between the first state and the second state by using the actuator device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
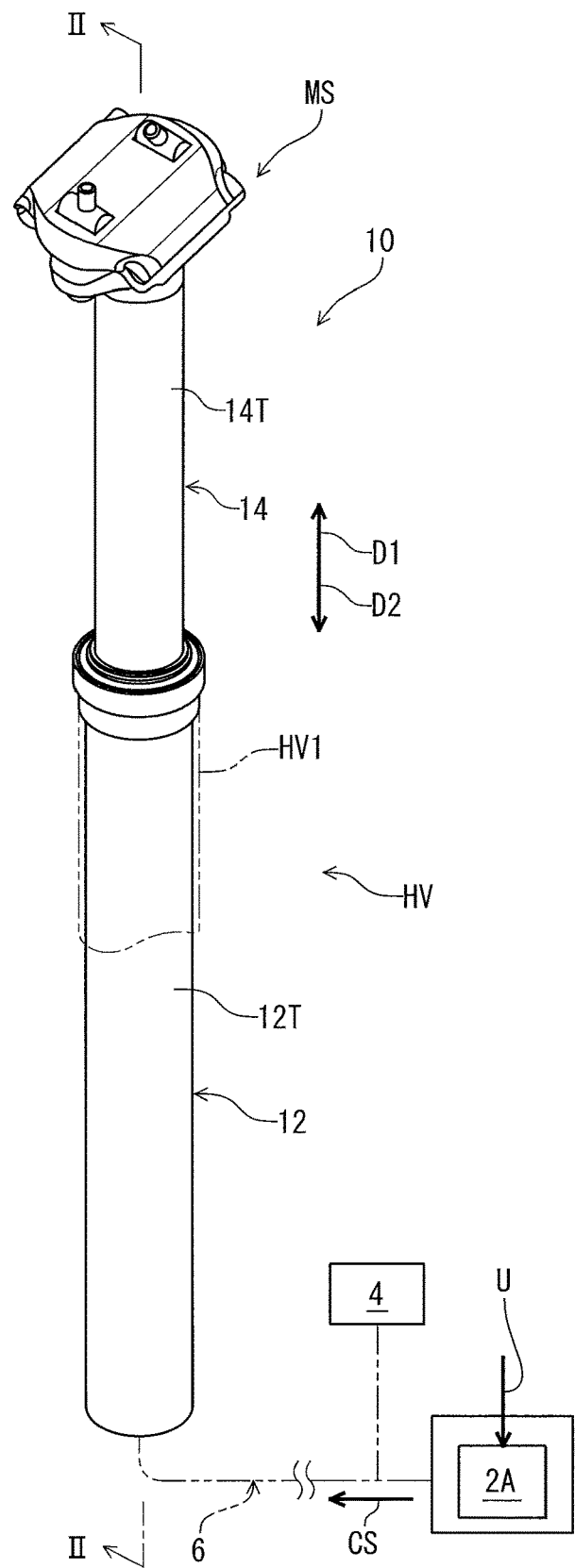
FIG. 1 is a perspective view of a rider-posture changing apparatus including an actuator device in accordance with a first embodiment.

The embodiment(s) will now be described with reference to the accompanying drawings, wherein like reference numerals designate corresponding or identical elements throughout the various drawings.

First Embodiment

As seen in FIG. 1, a rider-posture changing apparatus 10 for a human-powered vehicle HV comprises a first member 12 and a second member 14. The first member 12 extends in a longitudinal direction D1. The second member 14 extends in the longitudinal direction D1. The first member 12 and the second member 14 are relatively movable in the longitudinal direction D1. The first member 12 includes a first tube 12T extending in the longitudinal direction D1. The second member 14 includes a second tube 14T extending in the longitudinal direction D1. The second tube 14T is movably provided in the first tube 12T. In the present embodiment, the rider-posture changing apparatus 10 includes an adjustable seatpost. However, the rider-posture changing apparatus 10 can include devices other than the adjustable seatpost if needed and/or desired.

The rider-posture changing apparatus 10 further comprises a saddle mounting structure MS to fixedly mount a saddle to one of the first member 12 and the second member 14. In the present embodiment, the saddle mounting structure MS is attached to the second member 14 to fixedly mount the saddle to the second member 14. The first member 12 is configured to be mounted to a vehicle body HV1 of the human-powered vehicle HV. However, the saddle mounting structure MS can be attached to the first member 12 to fixedly mount the saddle to the first member 12. In such an embodiment, the second member 14 is configured to be mounted to the vehicle body HV1 of the human-powered vehicle HV.

Figure 2:
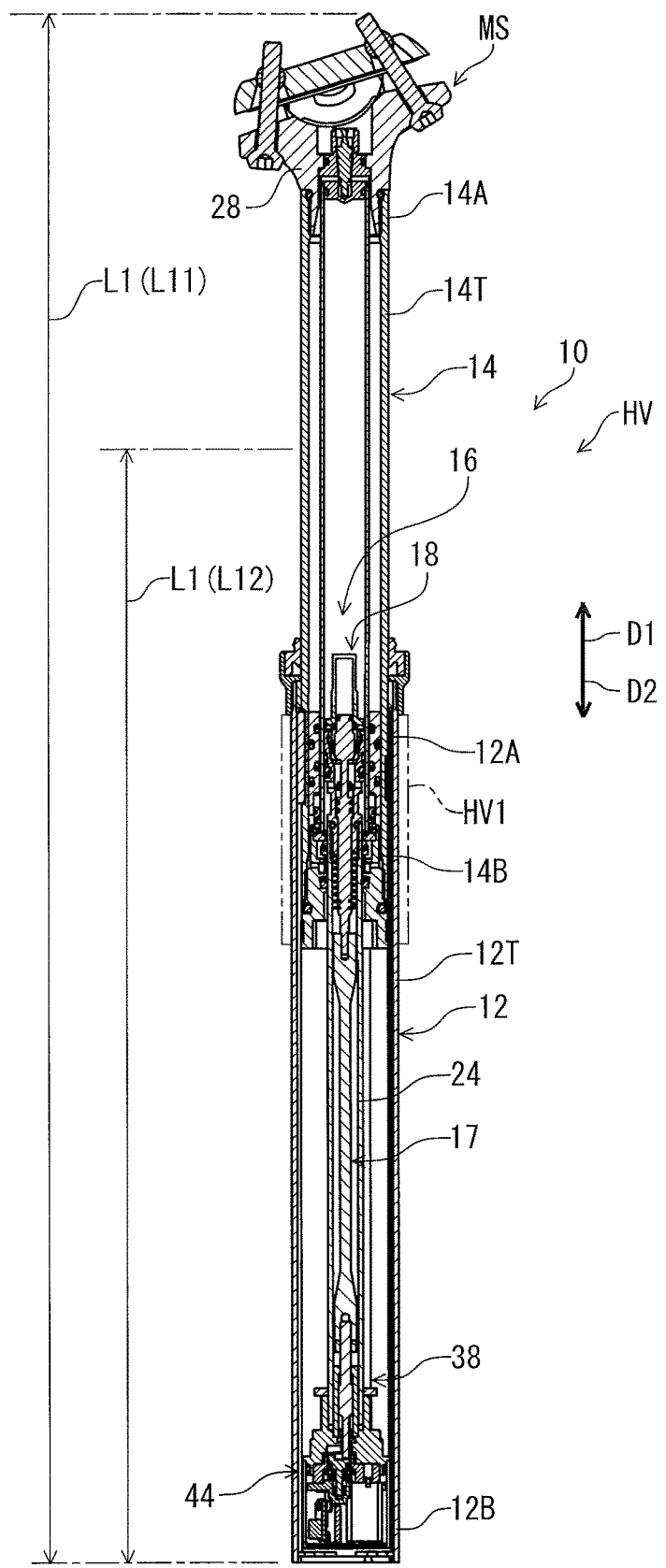
FIG. 2 is a cross-sectional view of the rider-posture changing apparatus taken along line II-II of FIG. 1.

As seen in FIG. 2, the second member 14 is telescopically coupled to the first member 12 to vary a total length L1 of the rider-posture changing apparatus 10. The rider-posture changing apparatus 10 has a maximum total length Ll1 and a minimum total length Ll2. The first member 12 includes a first end part 12A and a first opposite end 12B. The first member 12 extends between the first end part 12A and the first opposite end 12B in the longitudinal direction D1. The second member 14 includes a second end part 14A and a second opposite end 14B. The second member 14 extends between the second end part 14A and the second opposite end 14B in the longitudinal direction D1. The second opposite end 14B is provided in the first member 12. The first member 12 is configured to be detachably attached to the vehicle body HV1 of the human-powered vehicle HV. In the present embodiment, the first end part 12A is an upper end of the first member 12 in a mounting state where the rider-posture changing apparatus 10 is mounted to the vehicle body HV1 of the human-powered vehicle HV. The second end part 14A is an upper end of the second member 14 in the mounting state of the rider-posture changing apparatus 10. The rider-posture changing apparatus 10 is a height adjustable seatpost assembly. However, the rider-posture changing apparatus 10 can be other devices such as a suspension.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "forward," "rearward," "left," "right," "upward," and "downward" as well as any other similar directional terms refer to those directions which are determined on the basis of the rider who sits on a saddle or seat of the human-powered vehicle HV with facing a steering or handlebar. Accordingly, these terms, as utilized to describe the rider-posture changing apparatus 10, should be interpreted relative to the human-powered vehicle HV equipped with the rider-posture changing apparatus 10 as used in an upright riding position on a horizontal surface.

Figure 3:
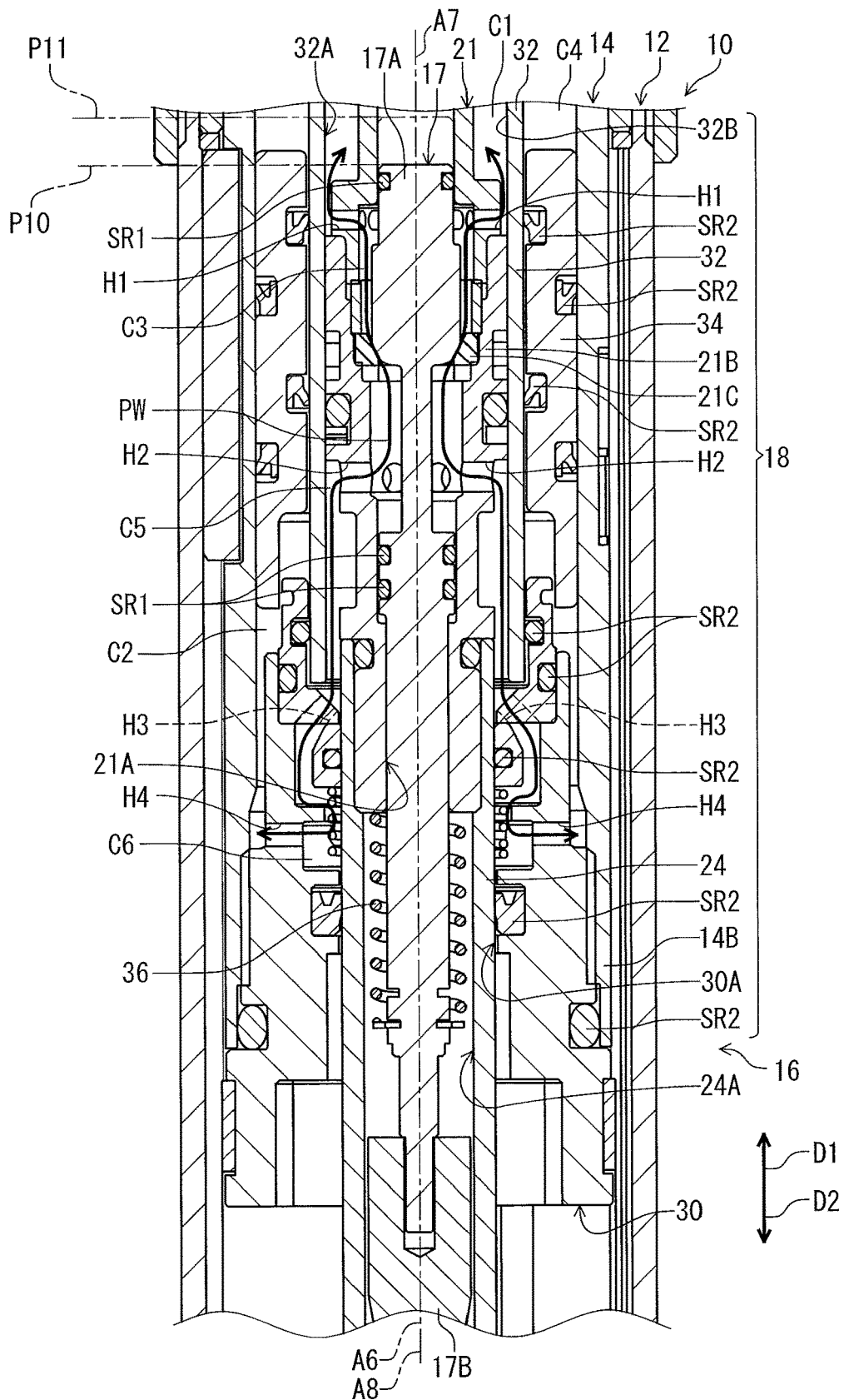
FIG. 3 is a partial cross-sectional view of the rider-posture changing apparatus illustrated in FIG. 2.

As seen in FIG. 3, the rider-posture changing apparatus 10 for the human-powered vehicle HV comprises a state changing structure 16. The state changing structure 16 is configured to change a state of the rider-posture changing apparatus 10. In the present embodiment, the state changing structure 16 is configured to change the state of the rider-posture changing apparatus 10 between a first state where the first member 12 and the second member 14 are restricted from moving relative to each other and a second state where the first member 12 and the second member 14 are relatively movable in the longitudinal direction D1. However, the state of the rider-posture changing apparatus 10 is not limited to the first state and the second state.

The state changing structure 16 includes a first hydraulic chamber C1, a second hydraulic chamber C2, and a valve member 17. The second hydraulic chamber C2 is configured to be in fluid communication with the first hydraulic chamber C1. The valve member 17 is configured to control a fluid communication between the first hydraulic chamber C1 and the second hydraulic chamber C2. In the present embodiment, the state changing structure 16 includes a hydraulic structure 18. The hydraulic structure 18 includes the first hydraulic chamber C1, the second hydraulic chamber C2, and the valve member 17. However, the state changing structure 16 can include structures other than the hydraulic structure 18 if needed and/or desired.

The hydraulic structure 18 includes a passageway PW. The passageway PW is provided between the first hydraulic chamber C1 and the second hydraulic chamber C2. The valve member 17 is configured to change the fluid communication state of the hydraulic structure 18 between a closed state where the valve member 17 closes the passageway PW and an open state where the valve member 17 opens the passageway PW. The first hydraulic chamber C1 and the second hydraulic chamber C2 are filled with a substantially incompressible fluid (e.g., oil).

The hydraulic structure 18 includes a valve structure 21. The valve member 17 is movable relative to the valve structure 21 between a closed position P10 and an open position P11 in the longitudinal direction D1. The hydraulic structure 18 is in a closed state when the valve member 17 is in the closed position P10. The hydraulic structure 18 is in the open state when the valve member 17 is in the open position P11. In the closed state, the first member 12 and the second member 14 are restricted from moving relative to each other. In the open state, the first member 12 and the second member 14 are relatively movable in the longitudinal direction D1. Namely, the closed state corresponds to the first state. The open state corresponds to the second state. The state changing structure 16 is configured to change the state of the rider-posture changing apparatus 10 between the closed state and the open state. The closed state can also be referred to as the first state. The open state can also be referred to as the second state. In the present embodiment, the hydraulic structure 18 has the closed position P10 and the open position P11. However, the valve member 17 can be configured to be movable relative to the valve structure 21 among the closed position P10, the open position P11, and another open position in the longitudinal direction D1 if needed and/or desired.

The hydraulic structure 18 includes a first inner tube 24. The valve structure 21 is secured to an end of the first inner tube 24. The valve structure 21 includes an internal cavity 21A. The first inner tube 24 includes a cavity 24A. The valve member 17 is movably provided in the internal cavity 21A and the cavity 24A. The valve member 17 and the valve structure 21 define a valve chamber C3 in the internal cavity 21A.

Figure 4:
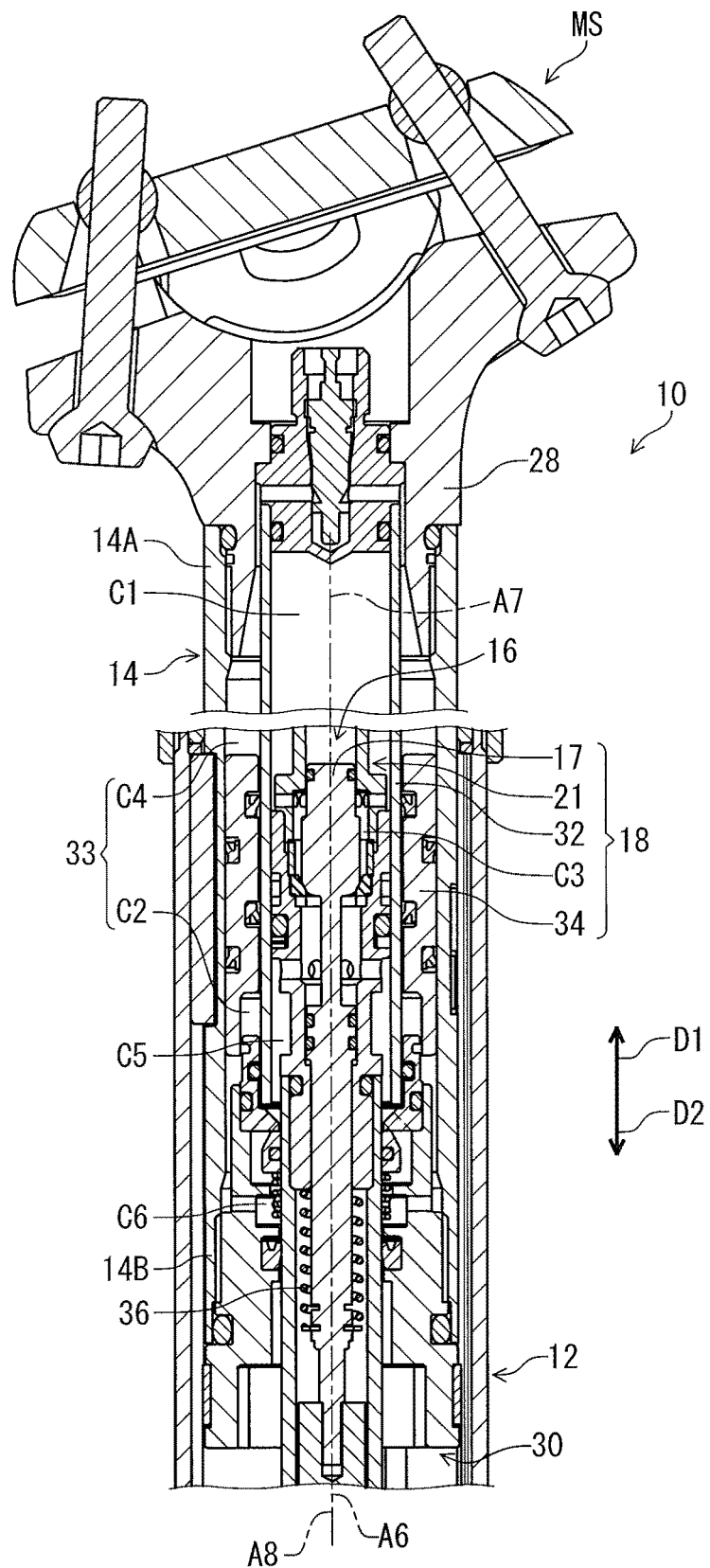
FIG. 4 is a partial cross-sectional view of the rider-posture changing apparatus illustrated in FIG. 2.

As seen in FIG. 4, the hydraulic structure 18 includes a support part 28, an intermediate support 30, and a second inner tube 32. The support part 28 is secured to the second end part 14A of the second member 14. The support part 28 is integrally provided with the saddle mounting structure MS and couples the saddle mounting structure MS to the second member 14. The intermediate support 30 is secured to the second opposite end 14B of the second member 14. The second inner tube 32 is provided in the second member 14 and disposed between the support part 28 and the intermediate support 30. The support part 28 and the intermediate support 30 are secured to the second member 14 to hold the second inner tube 32 in the second member 14. The second member 14, the second inner tube 32, the support part 28, and the intermediate support 30 define an inner space 33.

The hydraulic structure 18 includes a floating piston 34. The floating piston 34 is movably provided in the inner space 33 to divide the inner space 33 into the second hydraulic chamber C2 and a biasing chamber C4. The biasing chamber C4 is filled with a compressible fluid (e.g., gas such as air) to produce biasing force to lengthen the rider-posture changing apparatus 10. The compressible fluid is compressed in the biasing chamber C4 to produce the biasing force in a state where the total length L1 of the rider-posture changing apparatus 10 is the maximum total length L11 (FIG. 2).

Figure 5:
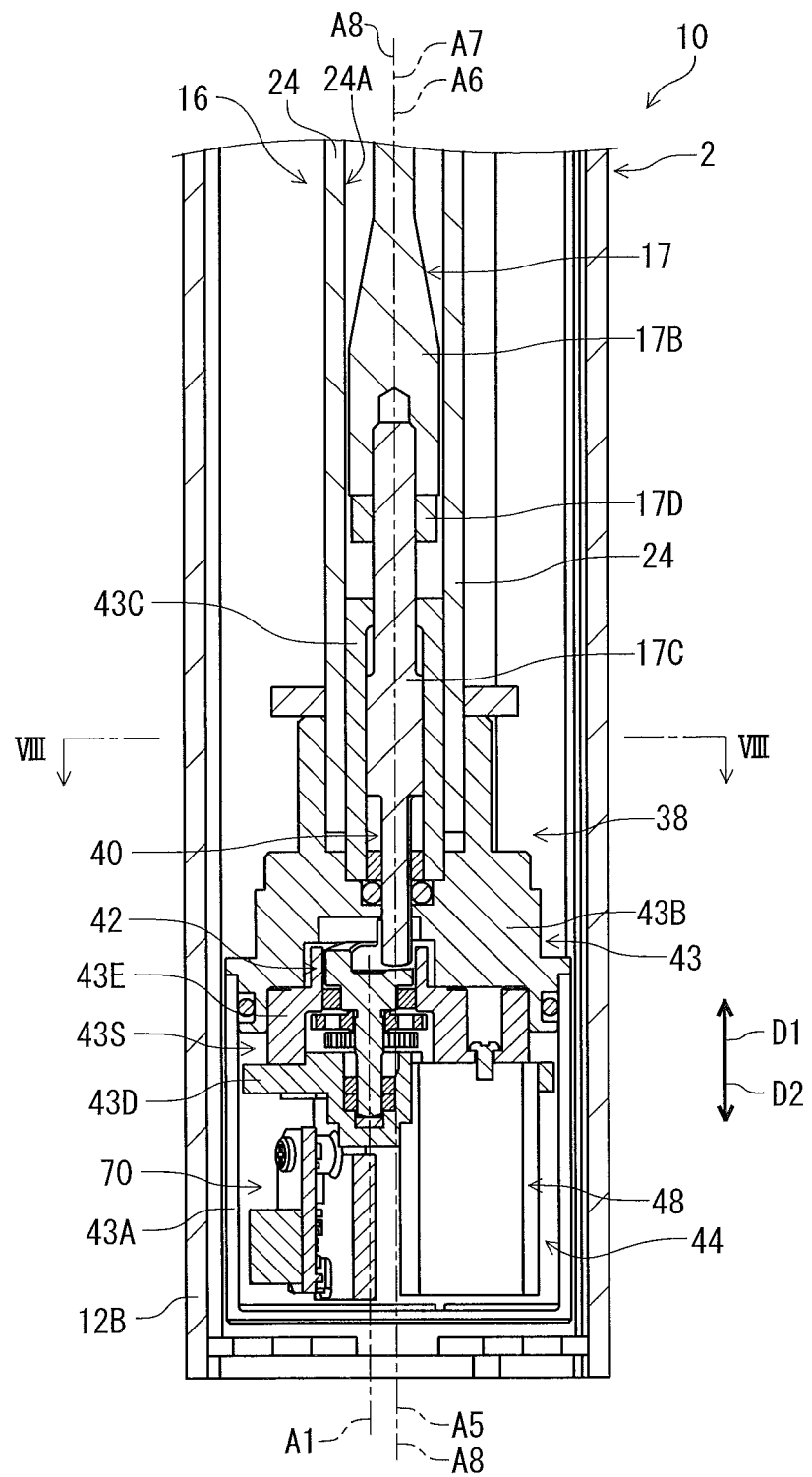
FIG. 5 is a partial cross-sectional view of the rider-posture changing apparatus illustrated in FIG. 2.

As seen in FIG. 3, the intermediate support 30 includes a support opening 30A. The first inner tube 24 extend through the support opening 30A. The valve structure 21 is movably provided in a cavity 32A of the second inner tube 32. The valve structure 21 is in slidable contact with an inner peripheral surface 32B of the second inner tube 32. As seen in FIG. 5, the valve structure 21, the second inner tube 32, and the support part 28 define the first hydraulic chamber C1 in the second inner tube 32.

As seen in FIG. 3, the first inner tube 24, the valve structure 21, the second inner tube 32, and the intermediate support 30 define a first intermediate chamber C5 and a second intermediate chamber C6. The valve structure 21 includes a plurality of first holes H1 and a plurality of second holes H2. The plurality of first holes H1 connects the first hydraulic chamber C1 to the valve chamber C3. The plurality of second holes H2 connects the valve chamber C3 to the first intermediate chamber C5. The intermediate support 30 includes a plurality of third holes H3 and a plurality of fourth holes H4. The plurality of third holes H3 connects the first intermediate chamber C5 to the second intermediate chamber C6. The plurality of fourth holes H4 connects the second intermediate chamber C6 to the second hydraulic chamber C2. The passageway PW includes the plurality of first holes H1, the valve chamber C3, the plurality of second holes H2, the first intermediate chamber C5, the plurality of third holes H3, the second intermediate chamber C6, and the plurality of fourth holes H4.

The valve structure 21 includes a valve base 21B and a valve seat 21C. The valve base 21B includes the plurality of first holes H1 and the plurality of second holes H2. The valve seat 21C is attached to the valve base 21B to be contactable with the valve member 17. The valve member 17 is in contact with the valve seat 21C to close the passageway PW in the first state where the valve member 17 is in the closed position P10. The valve member 17 is spaced apart from the valve seat 21C to open the passageway PW in the second state where the valve member 17 is in the open position P11.

The rider-posture changing apparatus 10 comprises a biasing member 36 to bias the valve member 17 toward the closed position P10. The biasing member 36 is provided in the first inner tube 24. For example, the biasing member 36 includes a spring. The valve member 17 includes a plurality of seal rings SR1. The hydraulic structure 18 includes a plurality of seal rings SR2.

The substantially incompressible fluid does not flow between the first hydraulic chamber C1 and the second hydraulic chamber C2 in the first state where the valve member 17 closes the passageway PW. Thus, in the first state, the first member 12 and the second member 14 are fixedly positioned relative to each other in the longitudinal direction D1.

The substantially incompressible fluid can flow between the first hydraulic chamber C1 and the second hydraulic chamber C2 through the passageway PW in the second state where the valve member 17 opens the passageway PW. For example, when the rider's weight is applied to the second member 14 in the second state, the substantially incompressible fluid flows from the first hydraulic chamber C1 to the second hydraulic chamber C2 through the passageway PW. Thus, the floating piston 34 is pressed toward the biasing chamber C4 relative to the first member 12, increasing a volume of the second hydraulic chamber C2 while the compressible fluid is compressed in the biasing chamber C4. This downwardly moves the second member 14 relative to the first member 12 against the basing force of the biasing chamber C4 while the rider's weight is applied to the second member 14, allowing the rider to lower the saddle using the rider's weight in the second state.

The compressible fluid compressed in the biasing chamber C4 biases the second member 14 to upwardly move relative to the first member 12 in the longitudinal direction D1 and to downwardly move the floating piston 34 in the longitudinal direction D1. When the rider's weight is released from the second member 14 in the second state, the substantially incompressible fluid flows from the second hydraulic chamber C2 to the first hydraulic chamber C1 through the passageway PW because of the biasing force of the biasing chamber C4. This upwardly moves the second member 14 relative to the first member 12 while the rider's weight is released from the second member 14, allowing the rider to lift the saddle by releasing the rider's weight in the second state.

As seen in FIG. 5, the rider-posture changing apparatus 10 for the human-powered vehicle HV comprises an actuator device 38. The actuator device 38 is coupled to the state changing structure 16. The actuator device 38 is at least partially provided in at least one of the first member 12 and the second member 14. In the present embodiment, the actuator device 38 is entirely provided in the first member 12. However, the actuator device 38 can be partially provided in at least one of the first member 12 and the second member 14 if needed and/or desired.

The actuator device 38 for the rider-posture changing apparatus of the human-powered vehicle HV comprises a cam follower 40 and a cam member 42. The cam follower 40 is coupled to the state changing structure 16. The cam member 42 is configured to actuate the state changing structure 16 via the cam follower 40 to change the state of the rider-posture changing apparatus 10. The cam follower 40 is coupled to the valve member 17 to move the valve member 17. In the present embodiment, the cam follower 40 is provided integrally with the valve member 17 as a one-piece unitary member. However, the cam follower 40 can be a separate member from the valve member 17 if needed and/or desired.

The cam member 42 is rotatable about a rotational axis A1. The cam member 42 is rotatable relative to the cam follower 42 about the rotational axis A1. The cam member 42 is rotatable relative to the first member 12 about the rotational axis A1. The cam member 42 is rotatable relative to the cam follower 42 about the rotational axis A1 to move the cam follower 40 relative to the cam member 42 in a movement direction D2. The cam member 42 is restricted from moving relative to the first member 12 in the movement direction D2. Thus, the cam member 42 is rotatable relative to the cam follower 42 about the rotational axis A1 to move the valve member 17 relative to the cam member 42 and the first member 12 in the movement direction D2.

The cam follower 40 extends in the movement direction D2. The cam follower 40 has a longitudinal center axis A5. The cam follower 40 extends along the longitudinal center axis A5. The longitudinal center axis A5 is parallel to the movement direction D2 and the rotational axis A1. In the present embodiment, the longitudinal center axis A5 is offset from the rotational axis A1. However, the longitudinal center axis A5 can be coincide with the rotational axis A1 if needed and/or desired.

As seen in FIGS. 3 to 5, the first member 12 has a first longitudinal center axis A6. The second member 14 has a second longitudinal center axis A7. The valve member 17 has a valve center axis A8. The first member 12 extends along the first longitudinal center axis A6. The second member 14 extends along the second longitudinal center axis A7. The valve member 17 extends along the valve center axis A8. In the present embodiment, the second longitudinal center axis A7 is coincident with the first longitudinal center axis A6. The valve center axis A8 is coincident with each of the first longitudinal center axis A6 and the second longitudinal center axis A7. However, the second longitudinal center axis A7 can be offset from the first longitudinal center axis A6 if needed and/or desired. The valve center axis A8 can be offset from at least one of the first longitudinal center axis A6 and the second longitudinal center axis A7 if needed and/or desired.

As seen in FIG. 5, the longitudinal center axis A5 of the cam follower 40 is coincident with at least one of the first longitudinal center axis A6 and the second longitudinal center axis A7. In the present embodiment, the longitudinal center axis A5 of the cam follower 40 is coincident with each of the first longitudinal center axis A6 and the second longitudinal center axis A7. However, the longitudinal center axis A5 of the cam follower 40 can be offset from at least one of the first longitudinal center axis A6 and the second longitudinal center axis A7 if needed and/or desired.

The actuator device 38 further comprises a base member 43. The cam follower 40 is movable relative to the base member 43 in the movement direction D2. The cam member 42 is rotatable relative to the base member 43 about the rotational axis A1. The cam member 42 is restricted from moving relative to the base member 43 in the movement direction D2.

The base member 43 is secured to one of the first member 12 and the second member 14. The base member 43 is at least partially provided in at least one of the first member 12 and the second member 14. In the present embodiment, the base member 43 is entirely provided in the first member 12. However, the base member 43 can be partially provided in at least one of the first member 12 and the second member 14 if needed and/or desired.

The base member 43 includes an internal space 43S. The cam follower 40 is at least partially provided in the internal space 43S. The cam member 42 is at least partially provided in the internal space 43S. In the present embodiment, the cam follower 40 is partially provided in the internal space 43S. The cam member 42 is entirely provided in the internal space 43S. However, the cam follower 40 can be entirely provided in the internal space 43S if needed and/or desired. The cam member 42 can be partially provided in the internal space 43S if needed and/or desired.

The base member 43 includes a first base body 43A, a second base body 43B, a third base body 43C, a fourth base body 43D, and a fifth base body 43E. The first base body 43A, the second base body 43B, and the third base body 43C define the internal space 43S. The fourth base body 43D and the fifth base body 43E are provided in the internal space 43S. The first inner tube 24 is secured to the base member 43. The second base body 43B is secured to the first base body 43A. The third base body 43C is secured to the second base body 43B. The fourth base body 43D is secured to the second base body 43B. The fifth base body 43E is secured to the fourth base body 43D. However, the base member 43 can have structures other than the illustrated structure if needed and/or desired. The second base body 43B can be integrally provided with the first base body 43A and the third base body 43C if needed and/or desired.

The base member 43 is configured to guide the valve member 17 in the movement direction D2. The valve member 17 is at least partially provided in the base member 43. The first inner tube 24 is secured to the base member 43. The first inner tube 24 is secured to the second base body 43B. The third base body 43C is provided in the first inner tube 24. The valve member 17 is movably provided in the base member 43. The valve member 17 is movably provided in the third base body 43C.

As seen in FIGS. 3 and 5, the valve member 17 includes a valve body 17A, a coupling rod 17B, a guided body 17C, and a fastener 17D. The coupling rod 17B couples the valve body 17A to the guided body 17C. The guided body 17C is secured to the coupling rod 17B with the fastener 17D. However, the guided body 17C can be secured to the coupling rod 17B without the fastener 17D. The guided body 17C can be integrally provided with the coupling rod 17B as a one-piece unitary member. The valve body 17A can be integrally provided with the coupling rod 17B as a one-piece unitary member.

As seen in FIG. 5, the base member 43 is configured to guide the guided body 17C of the valve member 17 in the movement direction D2. The guided body 17C is at least partially provided in the base member 43. The guided body 17C is at least partially provided in the third base body 43C. The guided body 17C is movably provided in the third base body 43C of the base member 43. The cam follower 42 is coupled to the guided body 17C. In the present embodiment, the guided body 17C is partially provided in the base member 43. The guided body 17C is partially provided in the third base body 43C. The cam follower 40 is integrally provided with the guided body 17C of the valve member 17 as a one-piece unitary member. However, the guided body 17C can be entirely provided in the base member 43 if needed and/or desired. The guided body 17C can be entirely provided in the third base body 43C if needed and/or desired. The cam follower 40 can be a separate member from the guided body 17C of the valve member 17 if needed and/or desired.

Figure 6:
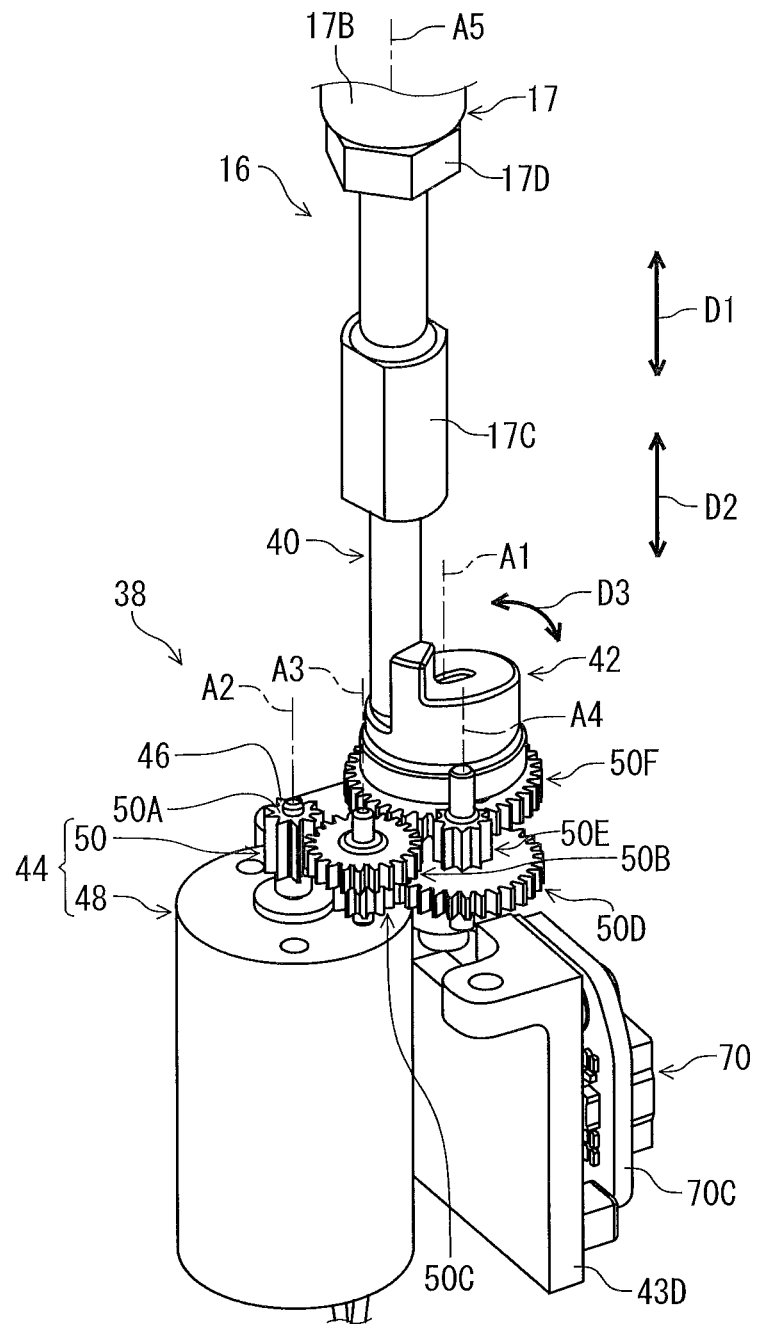
FIG. 6 is a partial perspective view of an internal structure of the rider-posture changing apparatus illustrated in FIG. 2.

As seen in FIG. 6, the movement direction D2 is different from a circumferential direction D3 defined about the rotational axis A1. The movement direction D2 is defined along the rotational axis A1. The movement direction D2 is defined along the longitudinal direction D1. In the present embodiment, the movement direction D2 is parallel to the longitudinal direction D1 and the rotational axis A1. However, the movement direction D2 can be non-parallel to at least one of the longitudinal direction D1 and the rotational axis A1 if needed and/or desired.

The actuator device 38 further comprises an electric actuator 44. The electric actuator 44 is coupled to the cam member 42 to rotate the cam member 42 about the rotational axis A1. The electric actuator 44 includes an output shaft 46 rotatable about an actuation rotational axis A2. The cam follower 40, the cam member 42, and the electric actuator 44 are provided in the first member 12.

In the present embodiment, the electric actuator 44 includes an electric motor 48 and a gear reducer 50. The electric motor 48 is configured to rotate the output shaft 46 about the actuation rotational axis A2. The output shaft 46 is coupled to a rotor of the electric motor 48. The gear reducer 50 is configured to reduce a rotational speed of the cam member 42 compared with a rotational speed of the output shaft 46. Examples of the electric motor 48 include a direct-current motor and a stepper motor.

The gear reducer 50 includes an output gear 50A, a first intermediate gear 50B, a second intermediate gear 50C, a third intermediate gear 50D, a fourth intermediate gear 50E, and a receiving gear 50F. The output gear 50A is attached to the output shaft 46 to be rotatable along with the output shaft 46 about the actuation rotational axis A2. The first intermediate gear 50B and the second intermediate gear 50C are rotatable about a first intermediate rotational axis A3. The third intermediate gear 50D and the fourth intermediate gear 50E are rotatable about a second intermediate rotational axis A4. The receiving gear 50F is attached to the cam member 42 to be rotatable along with the cam member 42 about the rotational axis A1. The output gear 50A meshes with the first intermediate gear 50B. The second intermediate gear 50C meshes with the third intermediate gear 50D. The fourth intermediate gear 50E meshes with the receiving gear 50F. The structure of the gear reducer 50 is not limited to the illustrated structure.

At least one of the rotational axis A1, the longitudinal center axis A5, the actuation rotational axis A2, and the first intermediate rotational axis A3, the second intermediate rotational axis A4 extends along the movement direction D2. In the present embodiment, the rotational axis A1, the longitudinal center axis A5, the actuation rotational axis A2, the first intermediate rotational axis A3, and the second intermediate rotational axis A4 extends along the movement direction D2. The rotational axis A1, the actuation rotational axis A2, the longitudinal center axis A5, the first intermediate rotational axis A3, and the second intermediate rotational axis A4 are parallel to the movement direction D2. The movement direction D2 is parallel to the longitudinal direction D1. However, at least one of the rotational axis A1, the longitudinal center axis A5, the actuation rotational axis A2, the first intermediate rotational axis A3, and the second intermediate rotational axis A4 can be inclined relative to the movement direction D2. The movement direction D2 can be inclined relative to the longitudinal direction D1.

Figure 7:
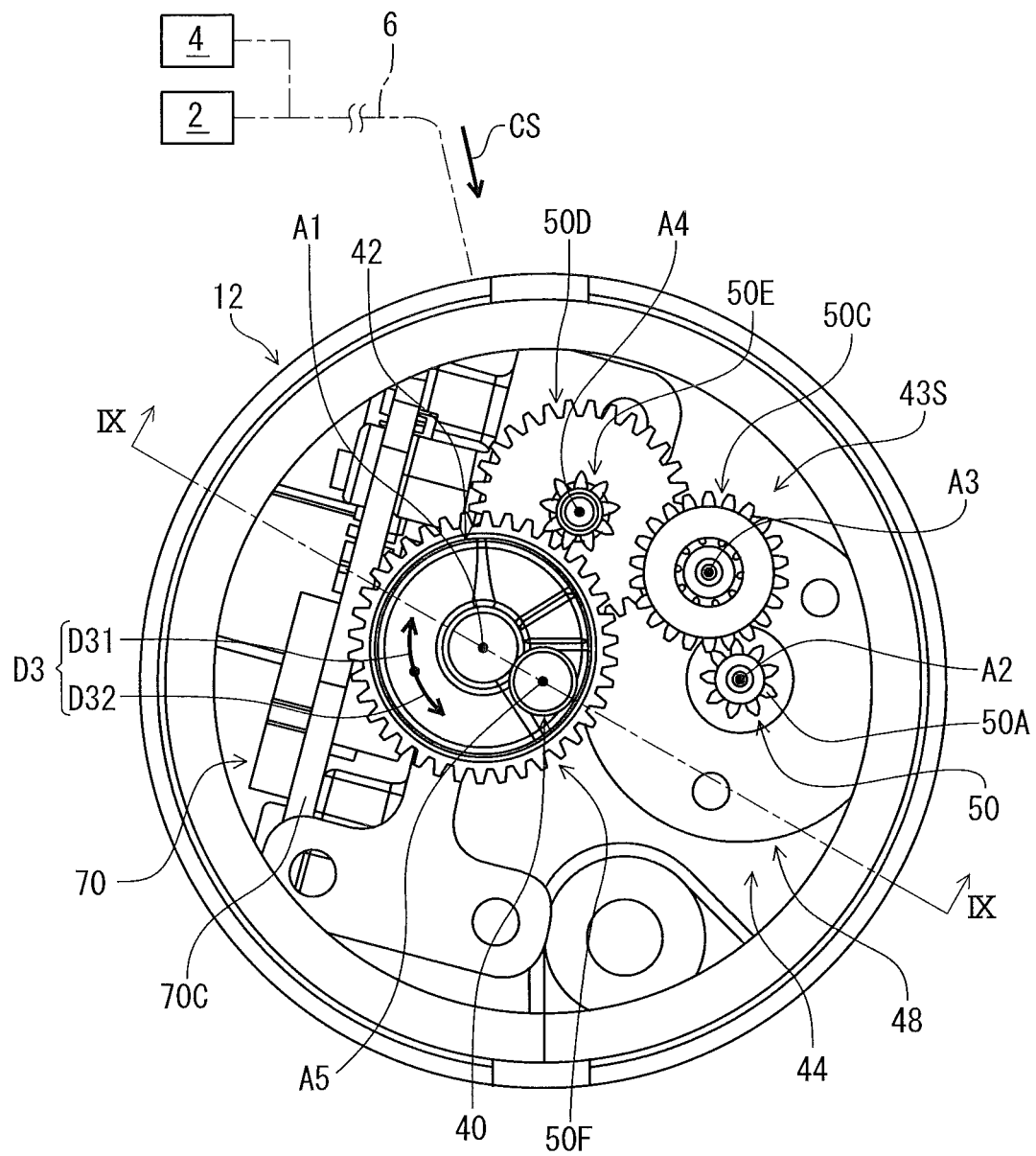
FIG. 7 is a plan view of the internal structure of the rider-posture changing apparatus illustrated in FIG. 2.

As seen in FIG. 7, the actuation rotational axis A2 is offset from at least one of the rotational axis A1 and the longitudinal center axis A5 as viewed in the movement direction D2. In the present embodiment, the actuation rotational axis A2 is offset from each of the rotational axis A1 and the longitudinal center axis A5 as viewed in the movement direction D2. The first intermediate rotational axis A3 is offset from the actuation rotational axis A2, the rotational axis A1, and the longitudinal center axis A5 as viewed in the movement direction D2. The second intermediate rotational axis A4 is offset from the actuation rotational axis A2, the rotational axis A1, the longitudinal center axis A5, and the first intermediate rotational axis A3 as viewed in the movement direction D2. However, the positional relationship between the actuation rotational axis A2, the rotational axis A1, the first intermediate rotational axis A3, and the second intermediate rotational axis A4 is not limited to the illustrated relationship. The actuation rotational axis A2 can be coincide with at least one of the rotational axis A1 and the longitudinal center axis A5 if needed and/or desired.

Figure 8:
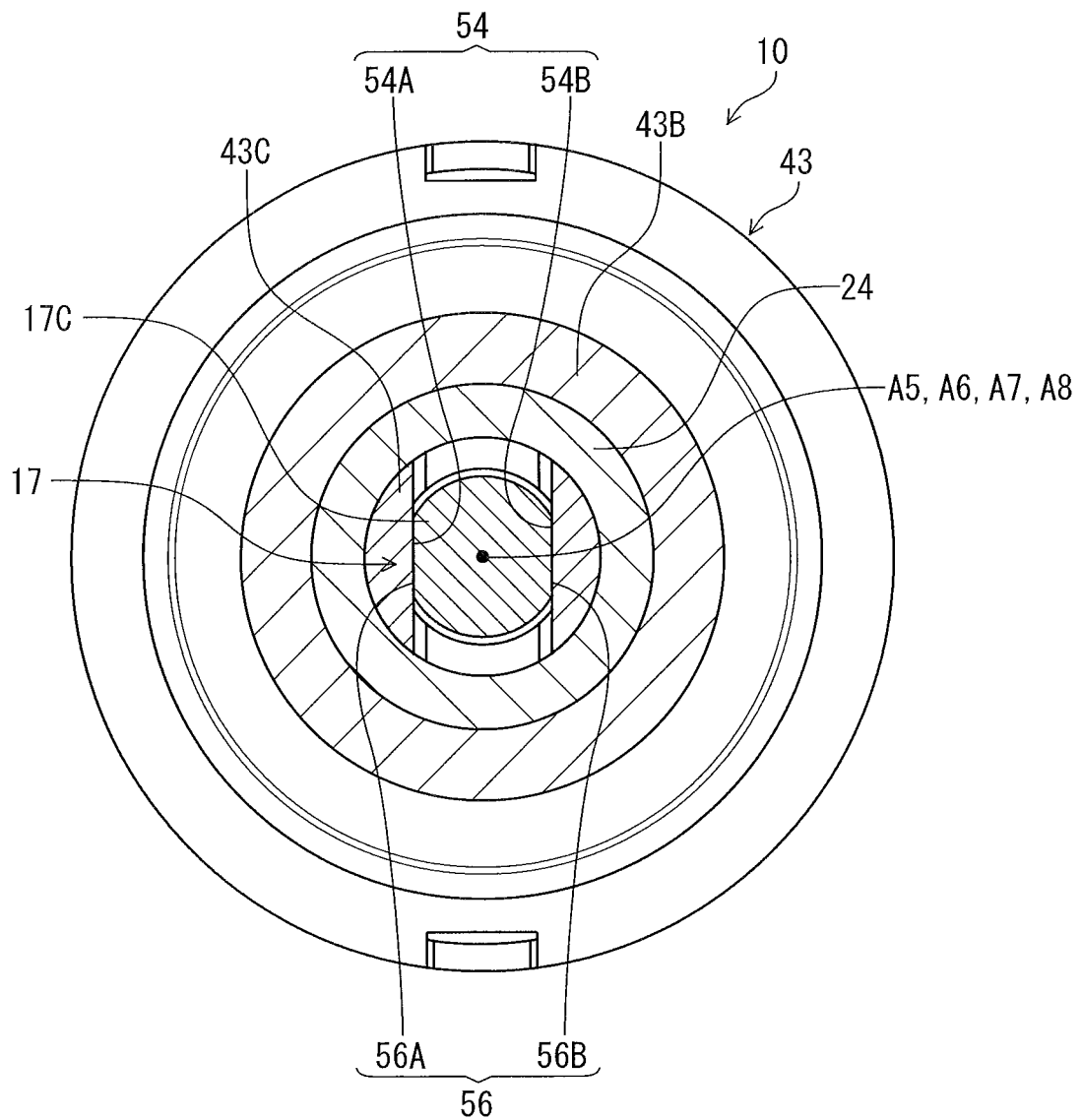
FIG. 8 is a cross-sectional view of the actuator device taken along line VIII-VIII of FIG. 5.

As seen in FIG. 8, the base member 43 includes a base member surface 54. The base member surface 54 is configured to be at least partially in contact with the valve member 17. The valve member 17 includes a valve member surface 56. The valve member surface 56 is configured to be at least partially in contact with the base member surface 54 such that a rotation of the valve member 17 relative to the base member 43 is restricted.

In the present embodiment, the base member surface 54 includes a first surface 54A and a second surface 54B. The first surface 54A is spaced apart from the second surface 54B. The first surface 54A is configured to face toward the second surface 54B. The rotational axis A1 is provided between the first surface 54A and the second surface 54B as viewed along the rotational axis A1.

The valve member surface 56 includes a first valve member surface 56A and a second valve member surface 56B. The first valve member surface 56A is provided on a reverse side of the second valve member surface 56B. The first surface 54A is configured to be in contact with the first valve member surface 56A. The second surface 54B is configured to be in contact with the second valve member surface 56B. Each of the first surface 54A, the second surface 54B, the first valve member surface 56A, and the second valve member surface 56B includes a flat surface. Thus, the base member 43 is configured to restrict the rotation of the valve member 17 relative to the base member 43 about the rotational axis A1 while allowing the valve member 17 to move relative to the base member 43 in the movement direction D2.

Figure 9:
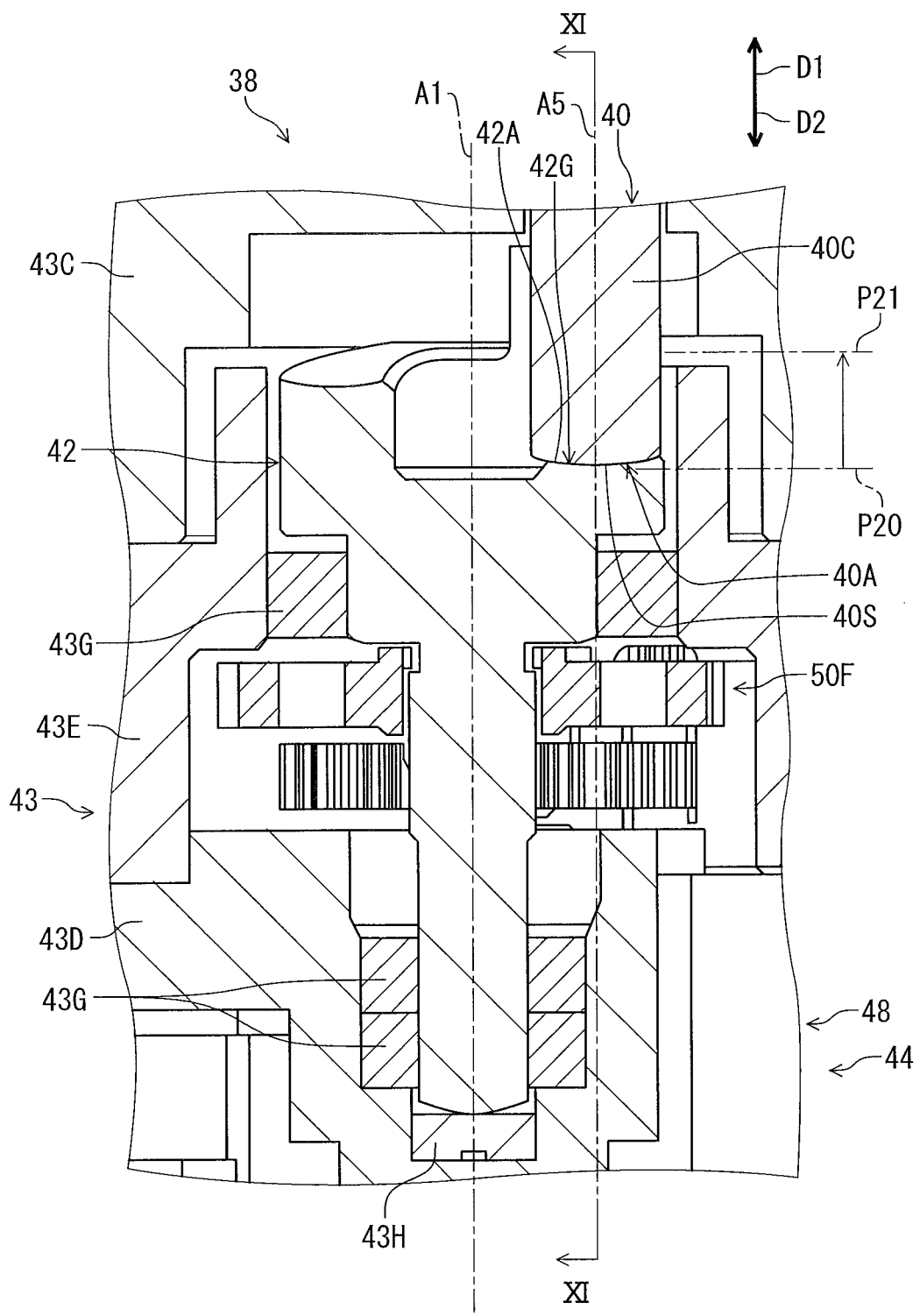
FIG. 9 is a cross-sectional view of the actuator device taken along line IX-IX of FIG. 7.

As seen in FIG. 9, the cam member 42 is rotatably supported by the base member 43 about the rotational axis A1. The receiving gear 50F is secured to the cam member 42 to rotate relative to the base member 43 along with the cam member 42. The base member 43 includes bushings 43G and a receiving member 43H. The bushings 43G rotatably support the cam member 42 about the rotational axis A1. The receiving member 43H slidably receives the cam member 42 in the movement direction D2.

The cam follower 40 is biased by the biasing member 36 (see e.g., FIG. 3) in the movement direction D2. The cam member 42 is biased by the biasing member 36 (see e.g., FIG. 3) in the movement direction D2 via the cam follower 40. Thus, the cam member 42 is held between the cam follower 42 and the base member 43 in the movement direction D2. The biasing member 36 (see e.g., FIG. 3) and the base member 43 restrict the cam member 42 from moving relative to the base member 43 in the movement direction D2.

Figure 10:
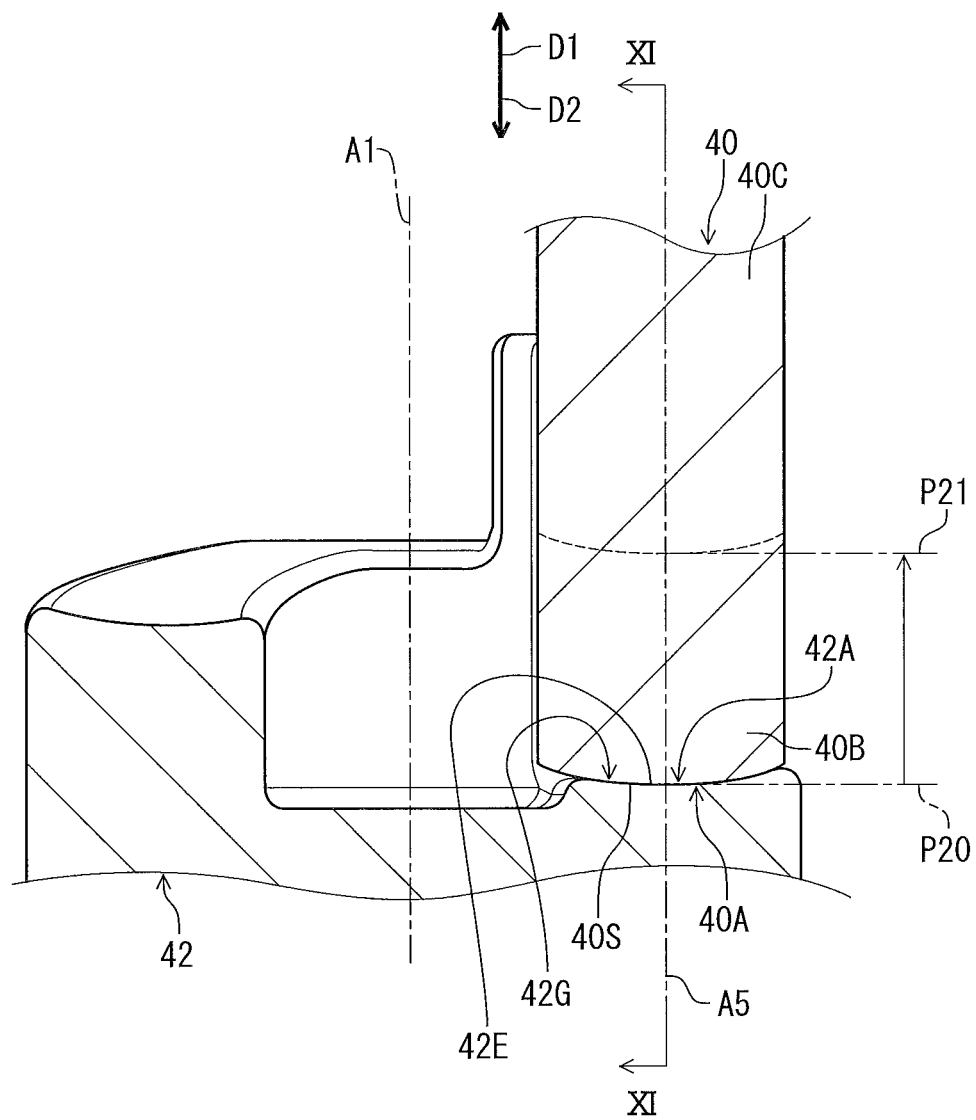
FIG. 10 is a cross-sectional view of a cam follower and a cam member of the actuator device illustrated in FIG. 9.

FIG. 10 is a partial cross-sectional view of the cam follower 40 and the cam member 42 taken along line X-X in FIG. 7. As seen in FIG. 10, at least one of the cam follower 40 and the cam member 42 includes a curved surface contactable with another of the cam follower 40 and the cam member 42 to move the cam follower 40 in the movement direction D2 in response to a rotation of the cam member 42. In the present embodiment, the cam follower 40 includes a first curved surface 40A. The cam member 42 includes a second curved surface 42A. The second curved surface 42A is contactable with the first curved surface 40A to move the cam follower 40 in the movement direction D2 in response to the rotation of the cam member 42. However, one of the first curved surface 40A and the second curved surface 42A can be a flat surface if needed and/or desired.

The curved surface has a curved shape in a first cross-section perpendicular to the circumferential direction D3 (see e.g., FIG. 7). The first curved surface 40A has a curved shape in a first cross-section. The second curved surface 42A has a curved shape in the first cross-section. As seen in FIG. 7, the first cross-section is defined to include the rotational axis A1 and the longitudinal center axis A5. The first cross-section extends radially outwardly from the rotational axis A1. The first cross-section extends radially outwardly from the longitudinal center axis A5.

As seen in FIG. 10, the cam follower 40 includes an end portion 40B including the first curved surface 40A. The cam follower 40 includes an elongated part 40C extending in the movement direction D2. The elongated part 40C includes the end portion 40B including the first curved surface 40A. The elongated part 40C extends along the longitudinal center axis A5.

The cam member 42 includes a cam groove 42G defined by the second curved surface 42A. The first curved surface 40A is at least partially provided in the cam groove 42G in a state where the first curved surface 40A is in contact with the second curved surface 42A. In the present embodiment, the first curved surface 40A is partially provided in the cam groove 42G in the state where the first curved surface 40A is in contact with the second curved surface 42A. However, the first curved surface 40A can be entirely provided in the cam groove 42G in the state where the first curved surface 40A is in contact with the second curved surface 42A if needed and/or desired.

The first curved surface 40A includes a convex curved shape. The second curved surface 42A includes a concave curved shape. However, the first curved shape can have shapes other than the convex curved shape if needed and/or desired. The second curved shape can have shapes other than the concave curved shape if needed and/or desired. For example, in a case where the first curved surface 40A has a concave curved shape, the second curved surface 42A can have a convex curved shape. In a case where only the cam member 42 includes a curved surface, the cam follower 40 includes a flat surface and the cam member 42 includes the second curved surface 4A has a convex curved shape.

The cam member 42 is configured to move the cam follower 40 between a first position P20 and a second position P21 in the movement direction D2. The first position P20 corresponds to the closed position P10 (see e.g., FIG. 3) of the valve member 17. The second position P21 corresponds to the open position P11 (see e.g., FIG. 3) of the valve member 17. Thus, the valve member 17 is in the closed position P10 in a state where the cam follower 40 is in the first position P20. The valve member 17 is in the open position P11 in a state where the cam follower 40 is in the second position P21.

Figure 11:
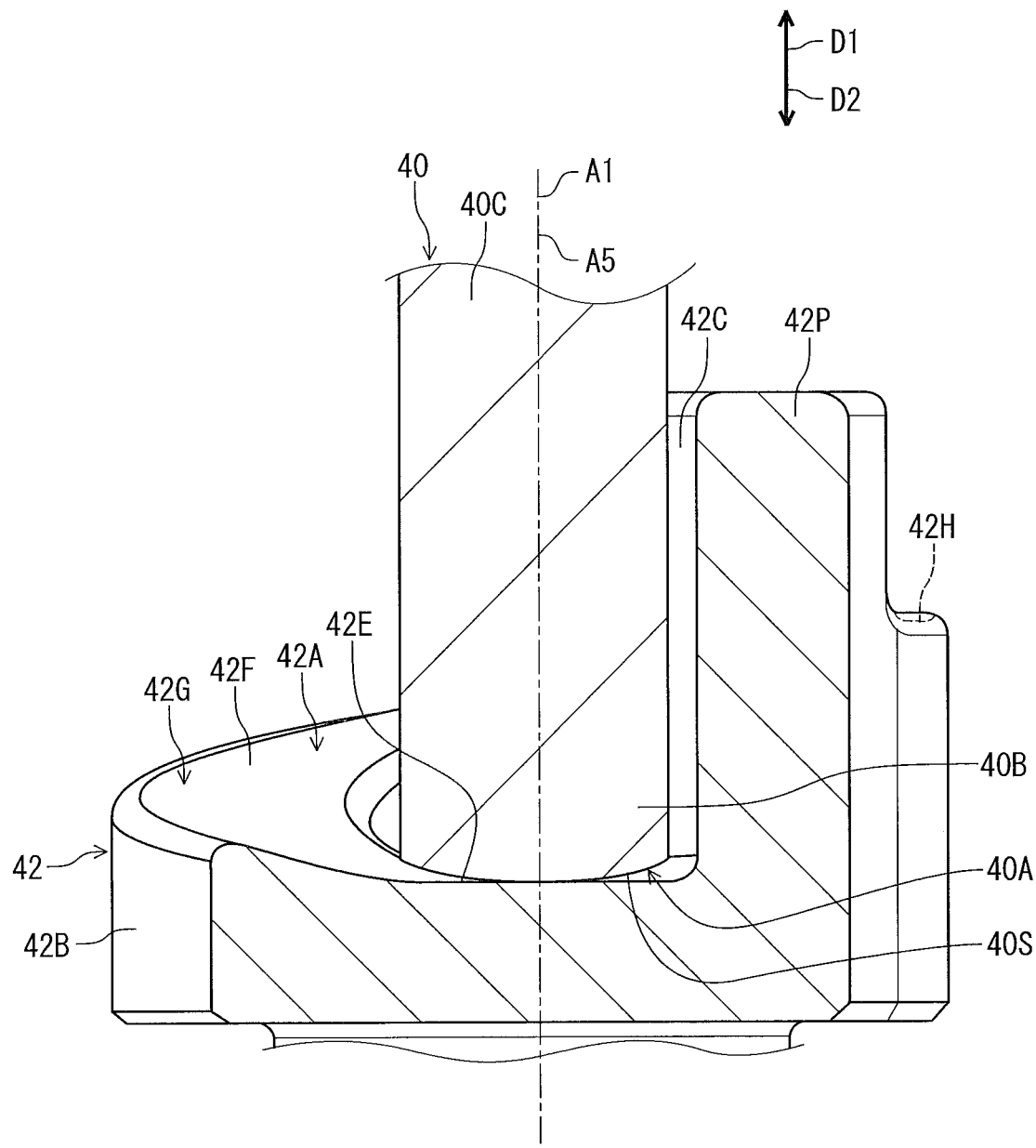
FIG. 11 is a cross-sectional view of the cam follower and the cam member of the actuator device taken along line XI-XI of FIG. 10.
Figure 12:
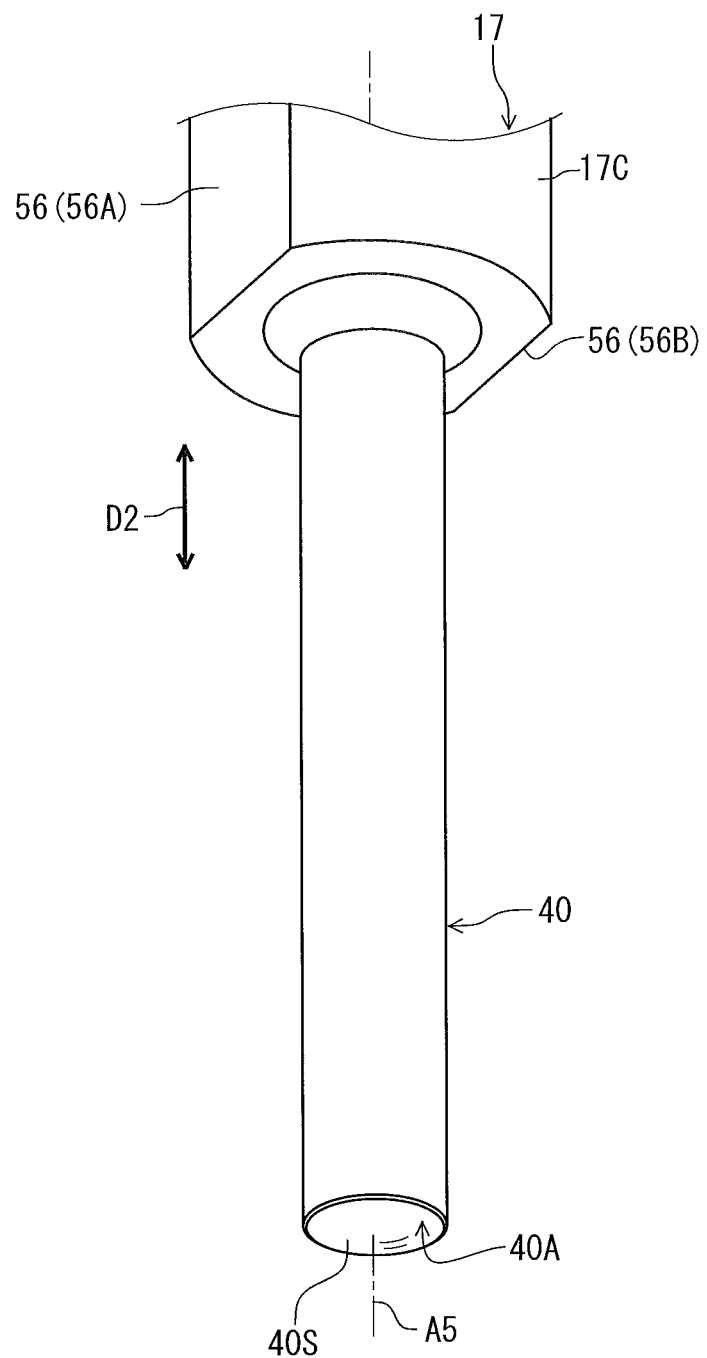
FIG. 12 is a perspective view of the cam follower of the actuator device illustrated in FIG. 9.

FIG. 11 is a partial cross-sectional view of the cam follower 40 and the cam member 42 taken along line XI-XI in FIG. 10. As seen in FIG. 11, the first curved surface 40A has a curved shape in a second cross-section perpendicular to a radial direction with respect to the rotational axis A1. As seen in FIG. 12, the first curved surface 40A includes a spherical surface 40S. The spherical surface 40S has a center of curvature provided on the longitudinal center axis A5. As seen in FIGS. 10 and 11, the second curved surface 42A is contactable with the spherical surface 40S to move the cam follower 40 in the movement direction D2 in response to the rotation of the cam member 42. However, the first curved surface 40A can have shapes other than the spherical shape if needed and/or desired.

Figure 13:
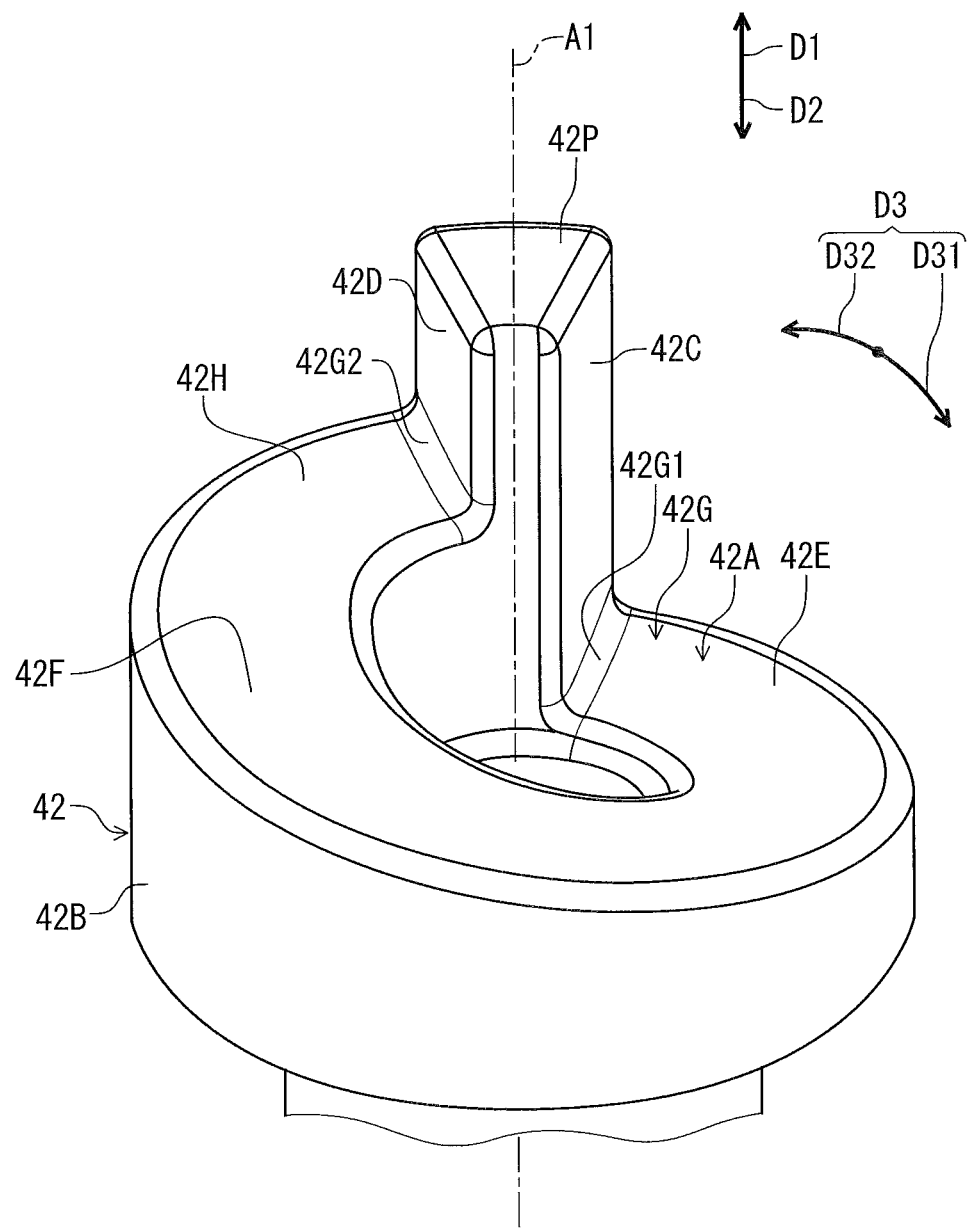
FIG. 13 is a perspective view of the cam member of the actuator device illustrated in FIG. 9.

As seen in FIG. 13, the second curved surface 42A extends along the circumferential direction D3 about the rotational axis A1. The cam groove 42G extends along the circumferential direction D3 about the rotational axis A1. The second curved surface 42A spirally extends about the rotational axis A1. The cam groove 42G spirally extends about the rotational axis A1.

The cam groove 42G includes a first end 42G1 and a second end 42G2. The cam groove 42G extends from the first end 42G1 to the second end 42G2. The second curved surface 42A extends from the first end 42G1 to the second end 42G2. The second curved surface 42A extends from the first end 42G1 to the second end 42G2 along the circumferential direction D3. The second curved surface 42A spirally extends from the first end 42G1 to the second end 42G2 about the rotational axis A1.

The cam member 42 includes a first stopper 42C and a second stopper 42D. The first stopper 42C is provided at the first end 42G1 of the cam groove 42G. The second stopper 42D is provided at the second end 42G2 of the cam groove 42G.

The cam member 42 includes a cam base 42B and a stopper protrusion 42P. The cam base 42B includes the second curved surface 42A. The cam base 42B includes the cam groove 42G. The stopper protrusion 42P extends from the cam base 42B in the movement direction D2. The stopper protrusion 42P includes the first stopper 42C and the second stopper 42D. The second stopper 42D is provided on the reverse side of the first stopper 42C in the circumferential direction D3.

Figure 14:
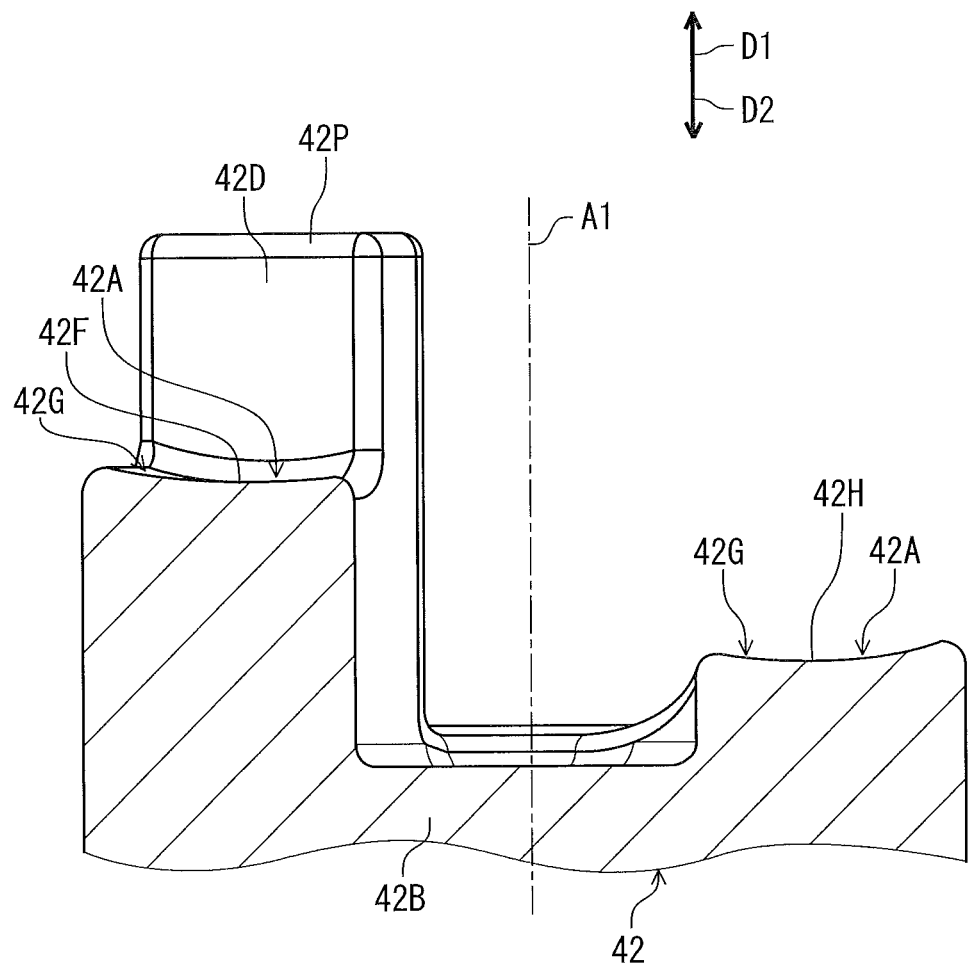
FIG. 14 is a cross-sectional view of the cam member taken along line XIV-XIV of FIG. 16.

As seen in FIG. 13, the cam member 42 includes a first cam surface 42E, a second cam surface 42F, and a third cam surface 42H. The cam groove 42G includes the first cam surface 42E, the second cam surface 42F, and the third cam surface 42H. As seen in FIG. 10, the first cam surface 42E includes the second curved surface 42A. As seen in FIG. 14, the second cam surface 42F includes the second curved surface 42A. The third cam surface 42H includes the second curved surface 42A.

Figure 15:
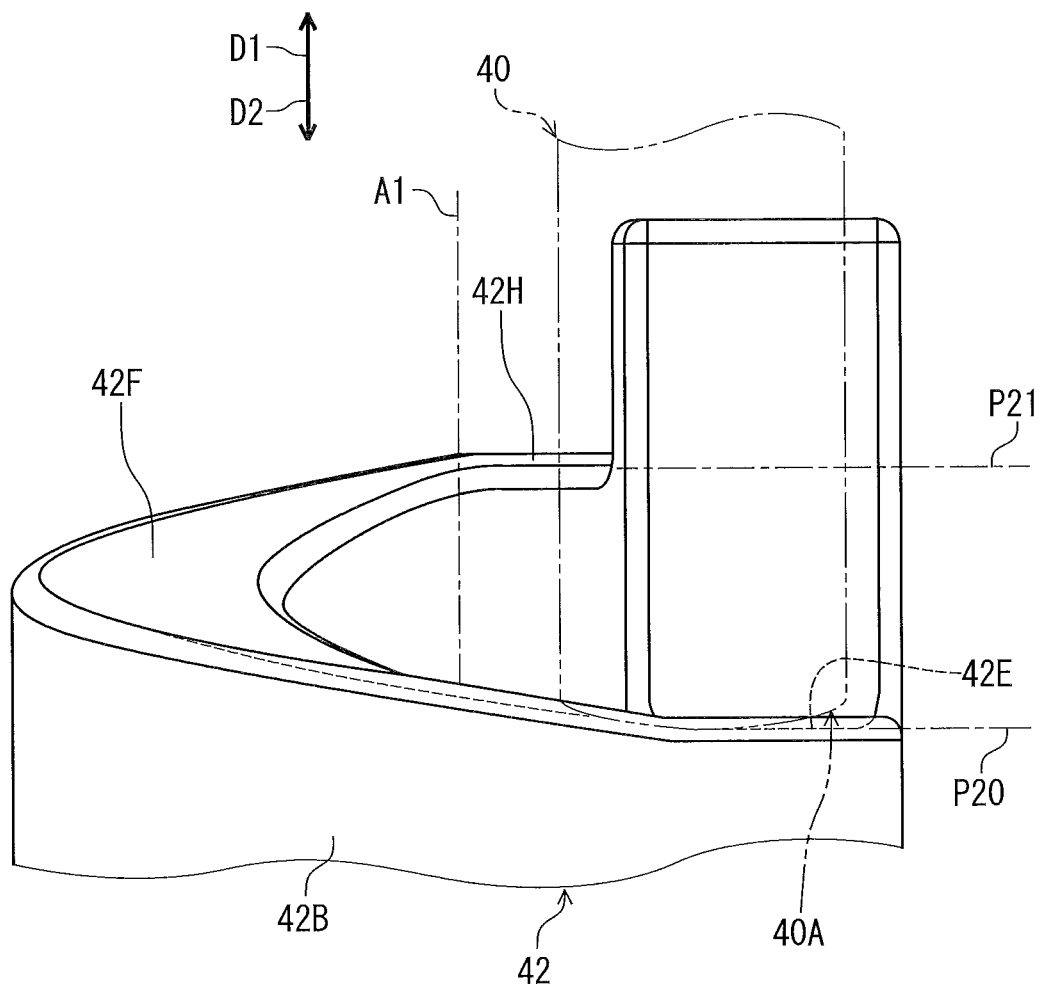
FIG. 15 is a side elevational view of the cam member of the actuator device illustrated in FIG. 9.

As seen in FIG. 15, the second cam surface 42F is offset from the first cam surface 42E in the movement direction D2. The third cam surface 42H is provided between the first cam surface 42E and the second cam surface 42F. The third cam surface 42H is inclined relative to the movement direction D2. The first cam surface 42E corresponds to the first position P20 of the cam follower 40. The first cam surface 42E corresponds to the second position P21 of the cam follower 40.

Figure 16:
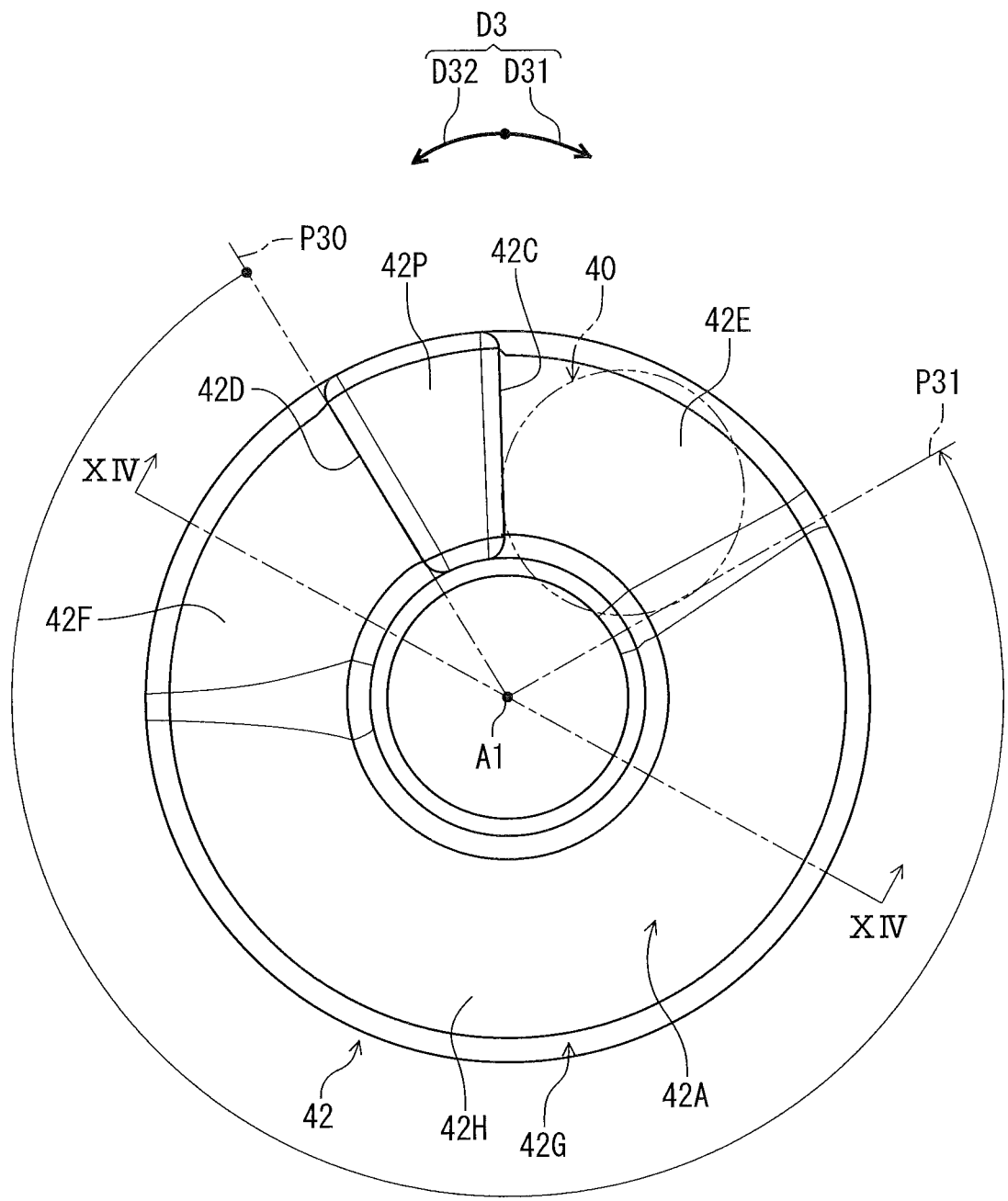
FIG. 16 is a plan view of the cam member illustrated in FIG. 15 (first position).

As seen in FIG. 16, the third cam surface 42H extends along the circumferential direction D3 about the rotational axis A1. The third cam surface 42H spirally extends about the rotational axis A1. The first cam surface 42E is provided between the first stopper 42C and the third cam surface 42H in the circumferential direction D3. The second cam surface 42F is provided between the second stopper 42D and the third cam surface 42H in the circumferential direction D3.

Figure 17:
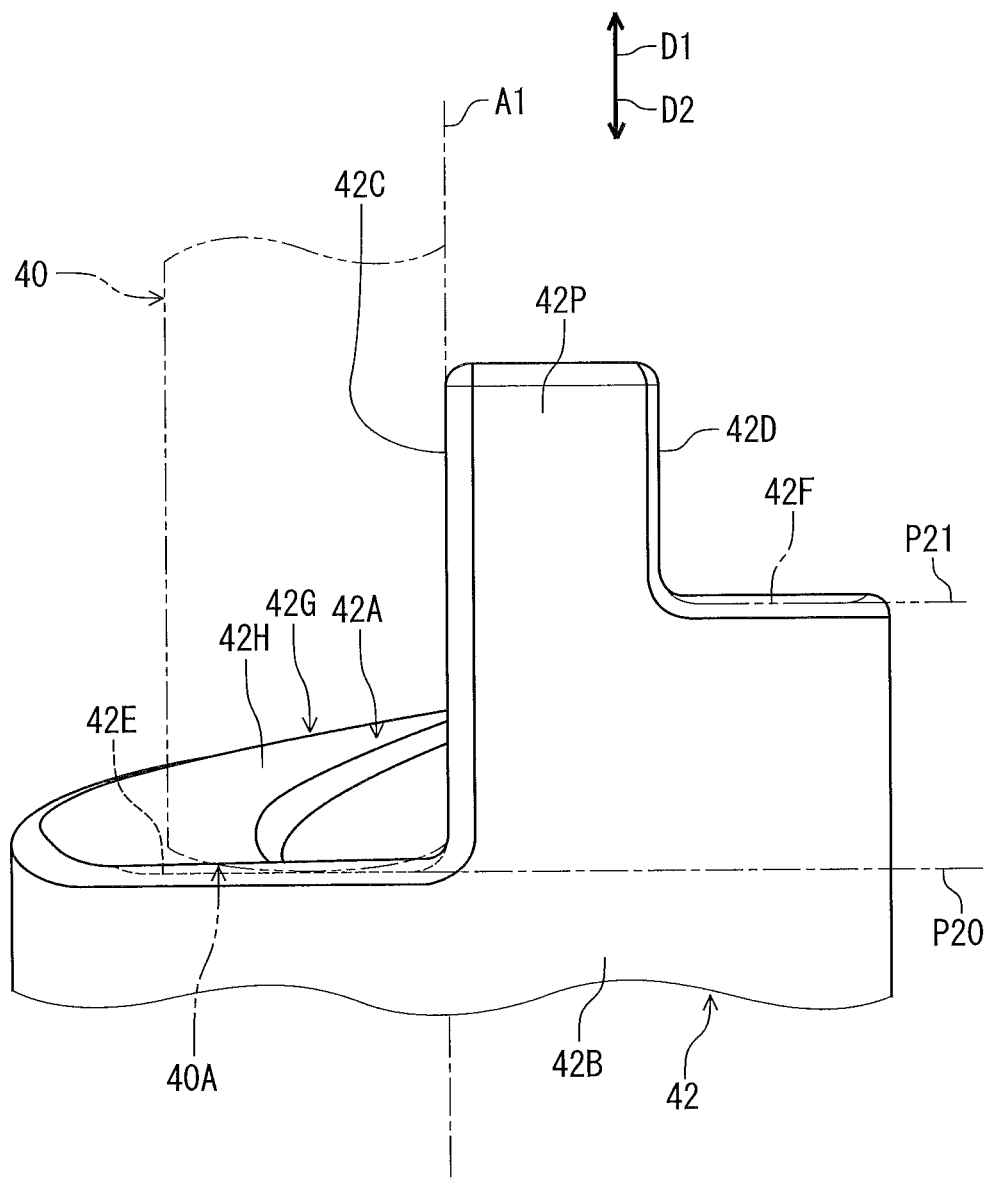
FIG. 17 is a side elevational view of the cam member illustrated in FIG. 15 (first position).

As seen in FIG. 16, the first stopper 42C is contactable with the cam follower 40 to stop the cam member 42 in a first rotational position P30. As seen in FIG. 17, the cam follower 40 is in the first position P20 in a state where the cam follower 40 is in contact with the first stopper 42C. The cam follower 40 is in contact with the first cam surface 42E in a state where the cam follower 40 is in contact with the first stopper 42C.

Figure 18:
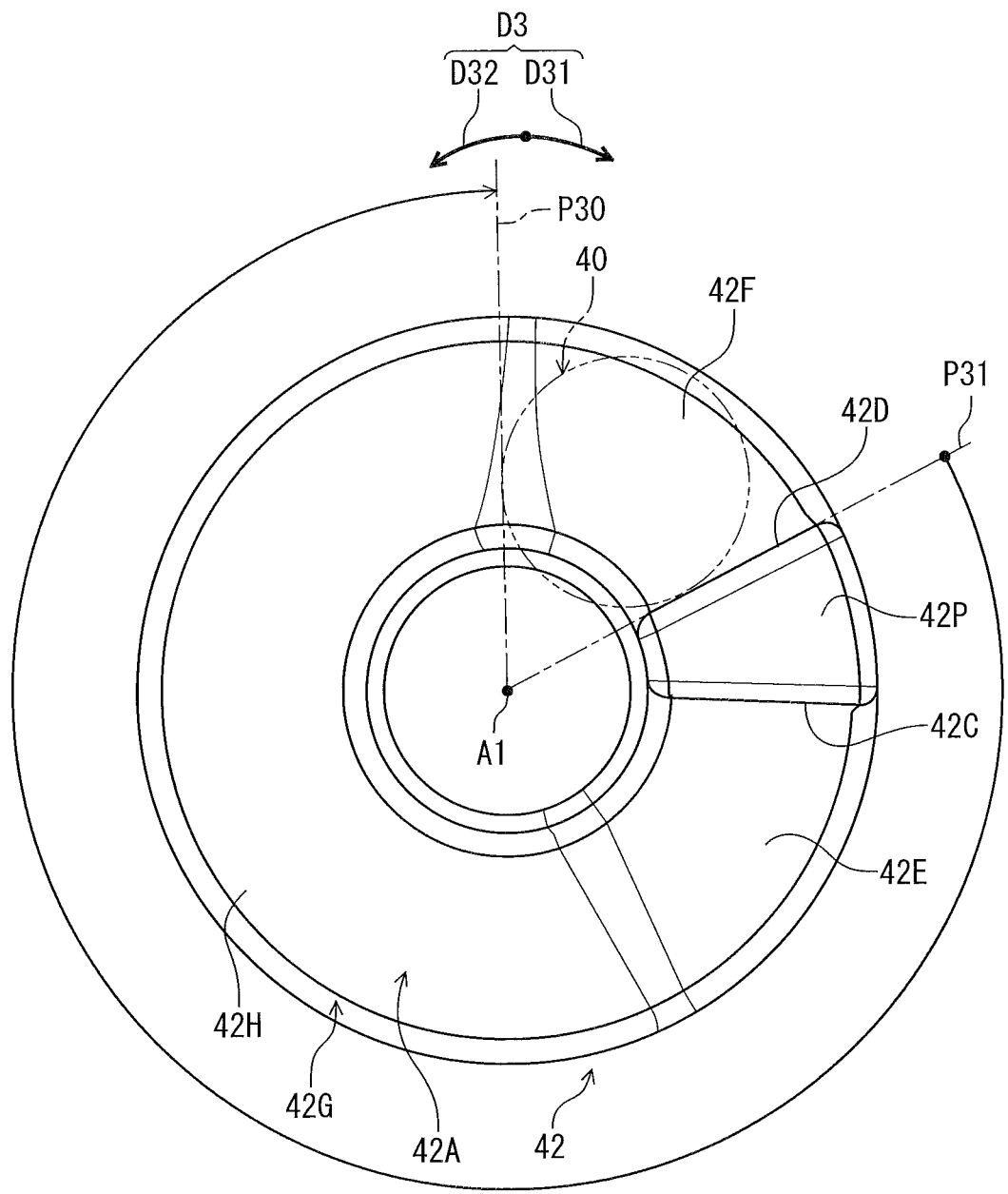
FIG. 18 is a plan view of the cam member illustrated in FIG. 15 (second position).
Figure 19:
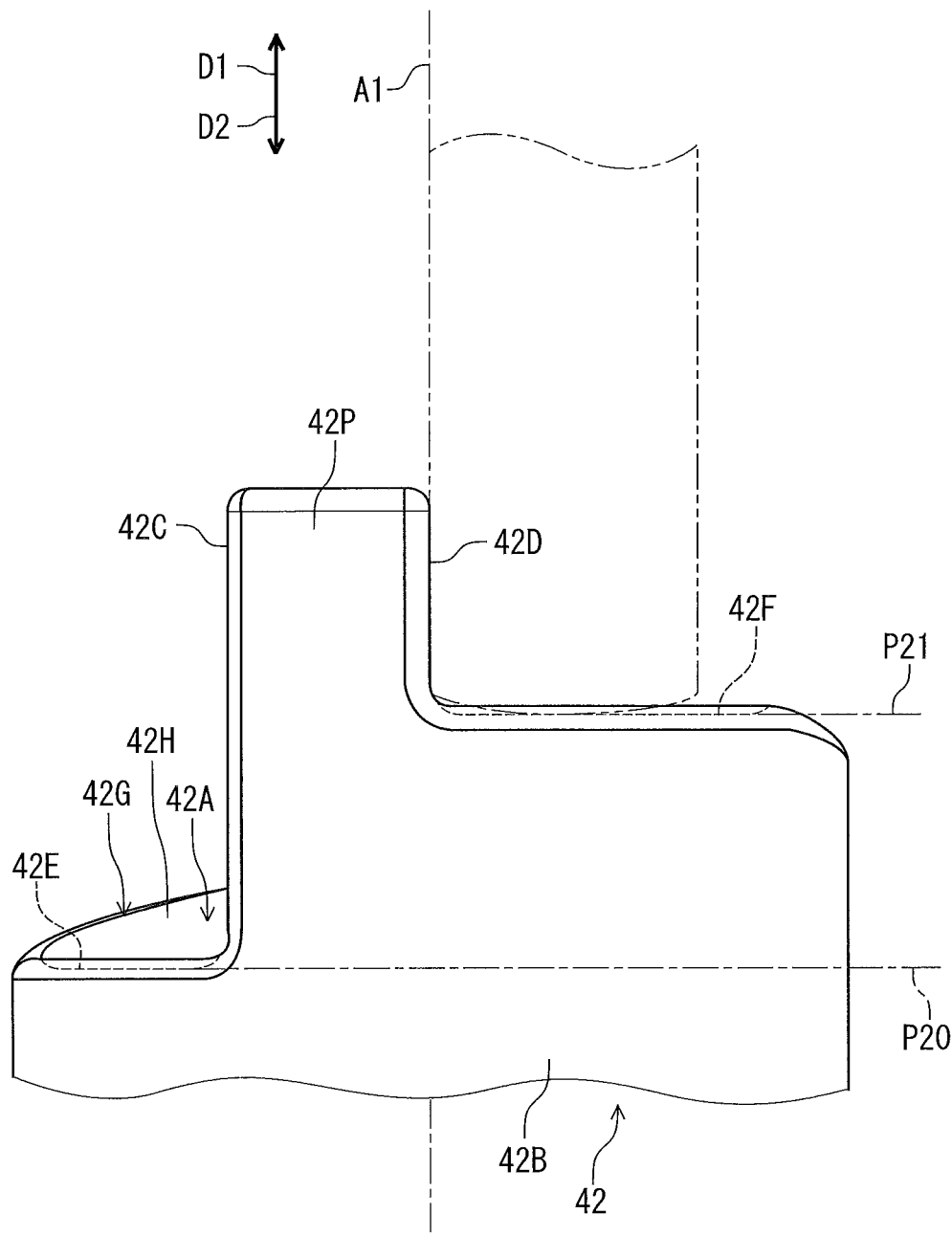
FIG. 19 is a side elevational view of the cam member illustrated in FIG. 15 (second position).

As seen in FIG. 18, the second stopper 42D is contactable with the cam follower 40 to stop the cam member 42 in a second rotational position P31. As seen in FIG. 19, the cam follower 40 is in the second position in a state where the cam follower 40 is in contact with the second stopper 42D. The cam follower 40 is in contact with the second cam surface 42F in a state where the cam follower 40 is in contact with the second stopper 42D.

As seen in FIGS. 16 and 18, the cam member 42 is rotatable relative to the cam follower 40 about the rotational axis A1 between the first rotational position P30 and the second rotational position P31 to move the cam follower 40 relative to the cam member 42 between the first position P20 (see e.g., FIG. 17) and the second position P21 (see e.g., FIG. 19). In FIG. 16, the cam member 42 is in the first rotational position P30 in a state where the first stopper 42C is in contact with the cam follower 42. In FIG. 18, the cam member 42 is in the second rotational position P31 in a state where the second stopper 42D is in contact with the cam follower 42. In FIGS. 15 and 17, each of the first rotational position P30 and the second rotational position P31 is indicated based on the second stopper 42D.

As seen in FIGS. 15 and 17, the cam member 42 is rotatable relative to the cam follower 40 about the rotational axis A1 from the first rotational position P30 to the second rotational position P31 in the first circumferential direction D31 to move the cam follower 40 relative to the cam member 42 from the first position P20 (see e.g., FIG. 17) to the second position P21 (see e.g., FIG. 19). The cam member 42 is rotatable relative to the cam follower 40 about the rotational axis A1 from the second rotational position P31 to the first rotational position P30 in the second circumferential direction D32 to move the cam follower 40 relative to the cam member 42 from the second position P21 (see e.g., FIG. 19) to the first position P20 (see e.g., FIG. 17). The second circumferential direction D32 is an opposite direction of the first circumferential direction D31. The circumferential direction D3 includes the first circumferential direction D31 and the second circumferential direction D32.

Figure 20:
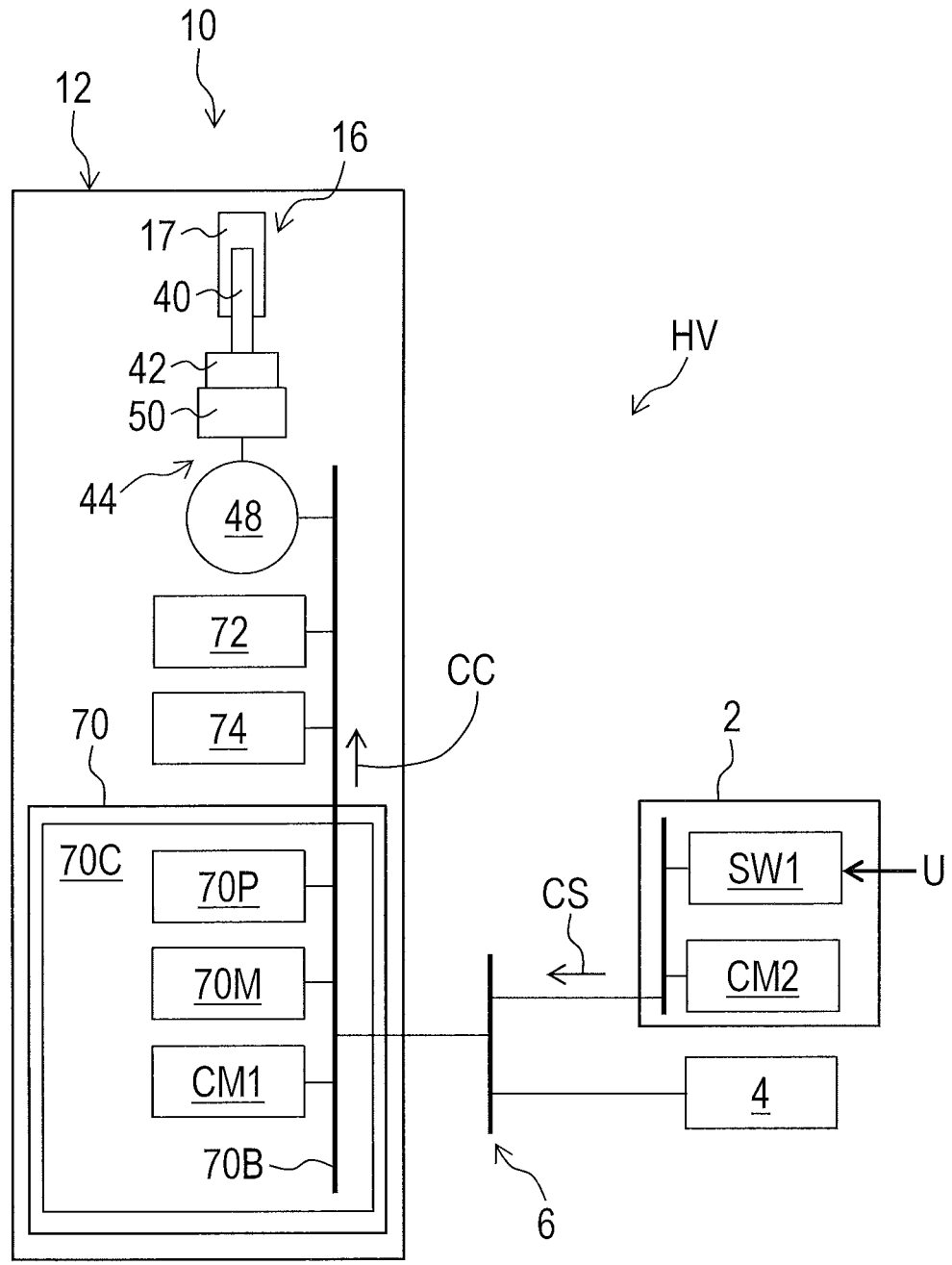
FIG. 20 is a schematic block diagram of the rider-posture changing apparatus illustrated in FIG. 1.

As seen in FIG. 20, the human-powered vehicle HV includes an operating device 2 and an electric power source 4. The operating device 2 is configured to receive a user input U to generate a control signal CS. The operating device 2 includes an electrical switch SW. The electrical switch SW is configured to receive a user input U to output a control signal CS. For example, the control signal CS indicates a change in the state of the rider-posture changing apparatus 10 from the first state to the second state. The structure of the operating device 2 is not limited to the present embodiment. The operating device 2 can have another structure if needed and/or desired. The control signal CS can indicate actions other than the change in the state of the rider-posture changing apparatus 10.

In the present embodiment, the electrical switch SW is configured to generate the control signal CS while the operating device 2 receives the user input U. However, the electrical switch SW can be configured to generate the control signal CS having a predetermined length regardless of a period of time for which the operating device 2 receives the user input U.

For example, the operating device 2 is provided at a position (e.g., a handlebar) where the rider can access the operating device 2. The electric power source 4 is mounted on a frame (not shown) of the human-powered vehicle HV. For example, the electric power source 4 includes a battery 4A. However, the electric power source 4 can include other components instead of or in addition to the battery 4A.

As seen in FIG. 20, the rider-posture changing apparatus 10 further comprises an electronic controller 70. The electronic controller 70 is configured to be electrically connected to the operating device 2 and the electric power source 4 with an electric cable 6. The electronic controller 70 is configured to receive the control signal CS from the operating device 2 via the electric cable 6. The electronic controller 70 is configured to be electrically connected to the electric actuator 44. The electric power source 4 is configured to supply electricity to the operating device 2, the electronic controller 70, and the electric actuator 44.

The electronic controller 70 includes a processor 70P, a memory 70M, a circuit board 70C, and a bus 70B. The processor 70P and the memory 70M are electrically mounted on the circuit board 70C. The processor 70P and the memory 70M are electrically connected to the circuit board 70C via the bus 70B. The processor 70P is electrically connected to the memory 70M via the circuit board 70C and the bus 70B.

For example, the processor 70P includes at least one of a central processing unit (CPU), a micro processing unit (MPU), and a memory controller. The memory 70M is electrically connected to the processor 70P. For example, the memory 70M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 70M includes storage areas each having an address. The processor 70P is configured to control the memory 70M to store data in the storage areas of the memory 70M and reads data from the storage areas of the memory 70M. The processor 70P can also be referred to as a hardware processor 70P. The memory 70M can also be referred to as a hardware memory 70M. The memory 70M can also be referred to as a computer-readable storage medium 70M.

The electronic controller 70 is programed to execute at least one control algorithm of the derailleur RD. The memory 70M (e.g., the ROM) stores at least one program including at least one program instruction. The at least one program is read into the processor 70P, and thereby the at least one control algorithm of the derailleur RD is executed based on the at least one program. The electronic controller 70 can also be referred to as an electronic controller circuit or circuitry 70. The electronic controller 70 can also be referred to as a hardware electronic controller 70.

The structure of the electronic controller 70 is not limited to the above structure. The structure of the 22 is not limited to the processor 70P, the memory 70M, and the bus 70B. The electronic controller 70 can be realized by hardware alone or a combination of hardware and software. The processor 70P and the memory 70M can be integrated as a one chip such as an application specific integrated circuit (ASIC) or a field programmable gate array (FPGA).

The electronic controller 70 is configured to control the electric actuator 44 to rotate the cam member 42 from the first rotational position P30 (see e.g., FIG. 16) to the second rotational position P31 (see e.g., FIG. 18) in response to the control signal CS transmitted from the operating device 2. The electronic controller 70 is configured to control the electric actuator 44 to move the cam follower 40 from the first position P20 (see e.g., FIG. 17) to the second position P21 (see e.g., FIG. 19) in response to the control signal CS transmitted from the operating device 2. Thus, the electronic controller 70 is configured to control the electric actuator 44 to move the valve member 17 from the closed position P10 (see e.g., FIG. 4) to the open position P11 (see e.g., FIG. 4) in response to the control signal CS transmitted from the operating device 2.

The electronic controller 70 is configured to control the electric actuator 44 to maintain the cam member 42 in the second rotational position P31 (see e.g., FIG. 18) while the electronic controller 70 receives the user input U. The electronic controller 70 is configured to control the electric actuator 44 to maintain the cam follower 40 in the second position P21 (see e.g., FIG. 19) while the electronic controller 70 receives the user input U. Thus, the electronic controller 70 is configured to control the electric actuator 44 to maintain the valve member 17 in the open position P11 (see e.g., FIG. 4) while the electronic controller 70 receives the user input U.

The electronic controller 70 is configured to control the electric actuator 44 to rotate the cam member 42 from the second rotational position P31 (see e.g., FIG. 18) to the first rotational position P30 (see e.g., FIG. 16) in response to the termination of the control signal CS. The electronic controller 70 is configured to control the electric actuator 44 to move the cam follower 40 from the second position P21 (see e.g., FIG. 19) to the first position P20 (see e.g., FIG. 17) in response to the termination of the control signal CS. Thus, the electronic controller 70 is configured to control the electric actuator 44 to move the valve member 17 from the open position P11 (see e.g., FIG. 4) to the closed position P10 (see e.g., FIG. 4) in response to the termination of the control signal CS. Accordingly, the state changing structure 16 allows the user to change the relative position between the first member 12 and the second member 14 in the longitudinal direction D1 while the electronic controller 70 receives the user input U.

The rider-posture changing apparatus 10 further comprises a communicator CM1 configured to be electrically connected to the electronic controller 70. The operating device 2 includes an additional communicator CM2 configured to electrically connected to the electrical switch SW. The communicator CM1 is configured to communicate with the additional communicator CM2 of the operating device 2 via a communication channel. In the present embodiment, the communicator CM1 is configured to communicate with the additional communicator CM2 via a wired communication channel. However, the communicator CM1 can be configured to communicate with the additional communicator CM2 via a wireless communication channel. In such a modification, for example, the electric power source 4 can be configured to be directly connected to the rider-posture changing apparatus 10.

The communicator CM1 can include a notification unit configured to notify a user of information relating to the communicator CM1. The notification unit can include a light emitting diode (LED) configured to indicate the information relating to the communicator CM1. The information relating to the communicator CM1 can include pairing state (e.g., pairing mode) of the communicator CM1 and/or communication status (e.g., transmission and/or receipt of wireless signals).

In the present embodiment, the communication channel is established using power line communication (PLC) technology. More specifically, the electric cable 6 includes a ground line and a voltage line. The PLC technology is used for communicating between electric components. The PLC carries data on a conductor that is also used simultaneously for electric power transmission or electric power distribution to the electric components. However, the communication channel can include a wireless communication channel.

As seen in FIG. 20, the electric actuator 44 includes a position sensor 72 and a motor driver 74. The electric motor 48 is electrically connected to the position sensor 72 and the motor driver 74. The position sensor 72 is configured to sense that a rotational angle of the cam member 42. Examples of the position sensor 72 include a potentiometer and a rotary encoder. In the present embodiment, the position sensor 72 is configured to sense an absolute rotational position of the cam member 42. The motor driver 74 is configured to control the electric motor 48 based on the control signal CS and the rotational position sensed by the position sensor 72.

The electronic controller 70 is configured to generate a control command CC based on the control signal CS. In the present embodiment, the motor driver 74 is configured to control the electric motor 48 to rotate the cam member 42 relative to the base member 43 from the first rotational position P30 to the second rotational position P31 in response to the control command CC. The motor driver 74 is configured to control the electric motor 48 to rotate the cam member 42 relative to the base member 43 from the second rotational position P31 to the first rotational position P30 in response to the termination of the control command CC.

The electronic controller 70 can have a wake-up mode in which the electronic controller 70 is configured to control the electric actuator 44 based on an input signal and a sleep mode in which the electronic controller 70 is suspended under electric power consumption that is lower than electric power consumption in the wake-up mode.

As seen in FIG. 4, the circuit board 70C is secured to the base member 43. In the present embodiment, the circuit board 70C is secured to the fourth base body 43D. The electronic controller 70 is provided at the first member 12. The electronic controller 70 is provided in the first member 12. The electronic controller 70 is provided in the internal space 43S of the base member 43. However, the electronic controller 70 can be at least partially provided outside the first member 12 and/or the second member 14. The electronic controller 70 can be at least partially provided at positions other than the first member 12. For example, the electronic controller 70 can be at least partially provided at the first member 12, the second member 14, the saddle mounting structure MS, and/or an external device.

As seen in FIG. 7, when the electronic controller 70 receives the control signal CS from the operating device 2, the electric actuator 44 rotates the cam member 42 relative to the base member 43 from the first rotational position P30 (see e.g., FIG. 16) toward the second rotational position P31 (see e.g., FIG. 18) in the second circumferential direction D32 about the rotational axis A1. As seen in FIGS. 17 and 19, the second curved surface 42A of the cam member 42 moves the cam follower 40 relative to the base member 43 from the first position P20 toward the second position P21 in the movement direction D2. As seen in FIGS. 18 and 19, the cam member 42 is stopped relative to the base member 43 in the second rotational position P31 when the second stopper 42D contacts the cam follower 40. The cam follower 40 is stopped relative to the base member 43 in the second position P21. Thus, as seen in FIG. 3, the valve member 17 is positioned in the open position P11 so that the state of the rider-posture changing apparatus 10 from the first state to the second state. This allows the hydraulic fluid to flow between the first hydraulic chamber C1 and the second hydraulic chamber C2 through the passageway PW. Accordingly, the second member 14 can be moved relative to the first member 12 in the longitudinal direction D1 while the electrical switch SW is pressed by the rider by applying or releasing the rider's weight to or from the second member 14.

As seen in FIG. 7, the electric actuator 44 rotates the cam member 42 relative to the base member 43 from the second rotational position P31 (see e.g., FIG. 18) to the first rotational position P30 (see e.g., FIG. 16) in response to the termination of the control signal CS. As seen in FIGS. 17 and 19, the second curved surface 42A of the cam member 42 moves the cam follower 40 relative to the base member 43 from the second position P21 toward the first position P20 in the movement direction D2. As seen in FIGS. 16 and 17, the cam member 42 is stopped relative to the base member 43 in the first rotational position P30 when the second stopper 42D contacts the cam follower 40. The cam follower 40 is stopped relative to the base member 43 in the first position P20. Thus, as seen in FIG. 3, the valve member 17 is returned to the closed position P10 so that the state of the rider-posture changing apparatus 10 from the second state to the first state. This restricts the hydraulic fluid from flowing between the first hydraulic chamber C1 and the second hydraulic chamber C2 through the passageway PW. Accordingly, the first member 12 and the second member 14 are fixedly positioned relative to each other in the longitudinal direction D1.

Second Embodiment

A rider-posture changing apparatus 210 in accordance with a second embodiment will be described below referring to FIG. 21. The rider-posture changing apparatus 210 has the same structure and/or configuration as those of the rider-posture changing apparatus 10 except for the first member 12, the second member 14, and the state changing structure 16. Thus, elements having substantially the same function as those in the first embodiment will be numbered the same here and will not be described and/or illustrated again in detail here for the sake of brevity.

Figure 21:
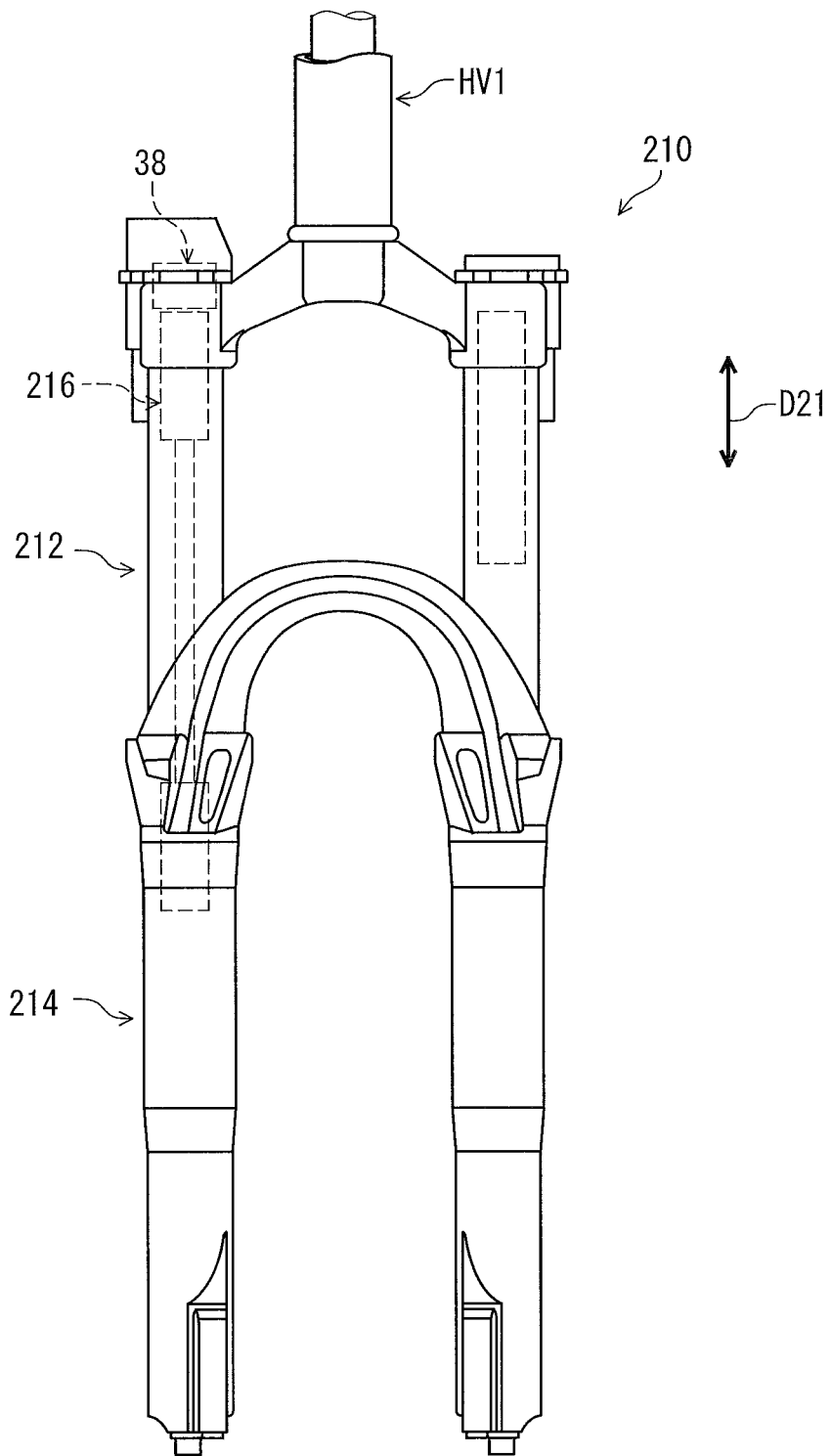
FIG. 21 is a side elevational view of a rider-posture changing apparatus in accordance with a second embodiment.

As seen in FIG. 21, the rider-posture changing apparatus 210 for the human-powered vehicle HV comprises a first member 212 and a second member 214. The first member 212 extends in a longitudinal direction D21. The second member 214 extends in the longitudinal direction D21. The first member 212 and the second member 214 are relatively movable in the longitudinal direction D21.

The rider-posture changing apparatus 210 for the human-powered vehicle HV comprises a state changing structure 216. The state changing structure 216 is configured to change a state of the rider-posture changing apparatus 210. For example, the state changing structure 216 is configured to change damper property, a stroke, or a locked state of the rider-posture changing apparatus 210.

In the present embodiment, for example, the state changing structure 216 is configured to change the state of the rider-posture changing apparatus 210 between a first state where the first member 212 and the second member 214 are restricted from moving relative to each other and a second state where the first member 212 and the second member 214 are relatively movable in the longitudinal direction D21. The first state can also be referred to as a locked state. The second state can also be referred to as a usage state. However, the state changing structure 216 can be configured to change the state of the rider-posture changing apparatus 210 between a low damping rate and a high damping rate. The state changing structure 216 can be configured to change the state of the rider-posture changing apparatus 210 between a shorter stroke and a longer stroke.

The rider-posture changing apparatus 210 for the human-powered vehicle HV comprises the actuator device 38. The actuator device 38 is coupled to the state changing structure 216. The actuator device 38 is at least partially provided in at least one of the first member 212 and the second member 214. In the present embodiment, the actuator device 38 is entirely provided in the first member 212. However, the actuator device 38 can be partially provided in at least one of the first member 212 and the second member 214 if needed and/or desired.

MODIFICATIONS

Figure 22:
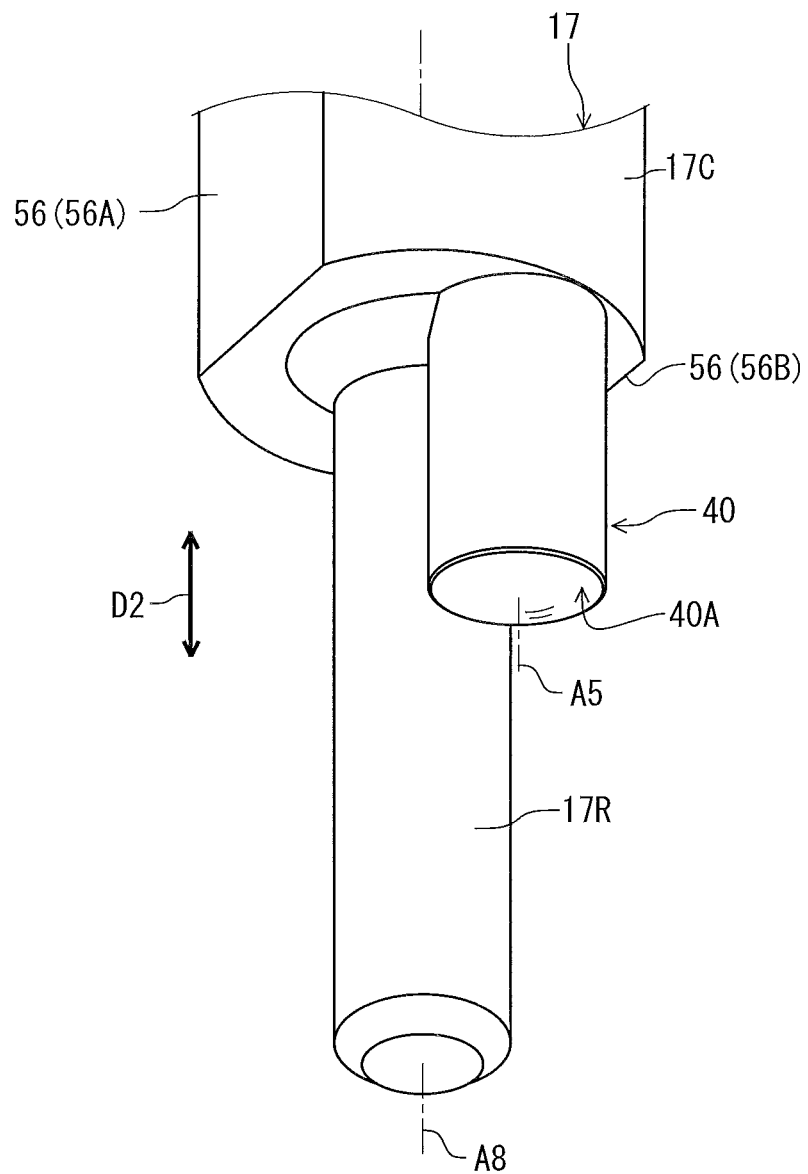
FIG. 22 is a perspective view of a cam follower of an actuator device in accordance with a modification.
Figure 23:
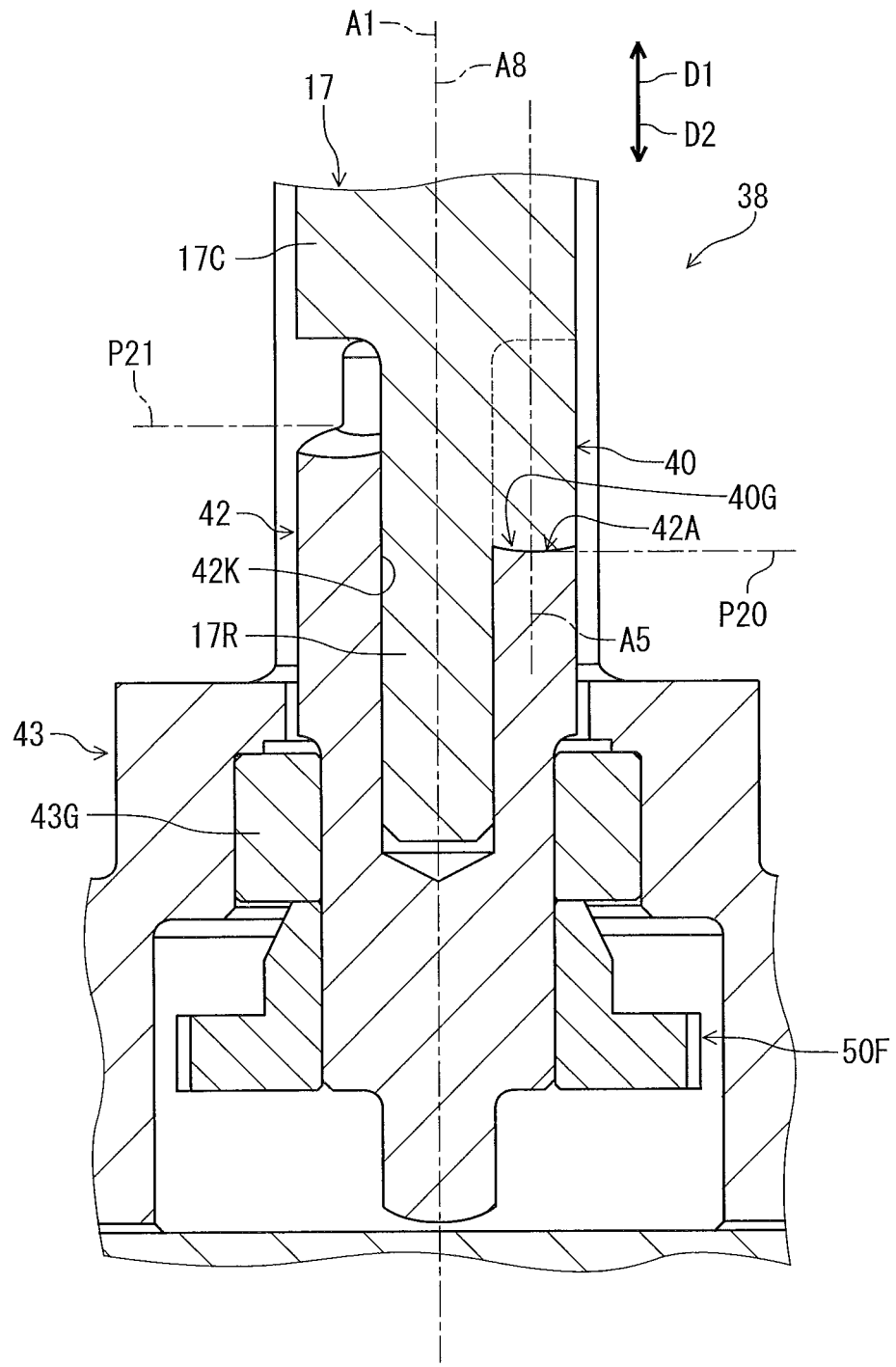
FIG. 23 is a cross-sectional view of the cam follower and a cam member of the actuator device in accordance with the modification.

In the first and second embodiments and the modifications thereof, as seen in FIGS. 5 and 12, the cam follower 40 has an elongated shape such as a rod. As seen in FIGS. 22 and 23, however, the cam follower 40 can have other shapes. In a modification illustrated in FIG. 22, the longitudinal center axis A5 of the cam follower 40 is offset from the valve center axis A8 of the valve member 17. The cam follower 40 extends from the valve member 17 along the longitudinal center axis A5. The valve member 17 includes a rod part 17R. The rod part 17R extends from the guided body 17C along the valve center axis A8.

In the modification illustrated in FIG. 23, the rotational axis A1 of the cam member 42 is coincident with the valve center axis A8 of the valve member 17. The longitudinal center axis A5 of the cam follower 40 is offset from the rotational axis A1 of the cam member 42. The cam member 42 includes a hole 42K. The rod part 17R is provided in the hole 42K. The cam member 42 is rotatably supported by the base member 43 and the rod part 17R of the valve member 17 about the rotational axis A1.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An actuator device for a rider-posture changing apparatus of a human-powered vehicle, comprising:
    a cam follower; and
    a cam member rotatable about a rotational axis defining an axial direction and a circumferential direction, at least one of the cam follower and the cam member including a curved surface contactable with another of the cam follower and the cam member to move the cam follower in a movement direction in response to a rotation of the cam member, the movement direction being different from the circumferential direction defined about the rotational axis,
    the curved surface having a curved shape in a first cross-section perpendicular to the circumferential direction.

2. The actuator device according to claim 1, wherein
    the cam follower includes a first curved surface,
    the cam member includes a second curved surface contactable with the first curved surface to move the cam follower in the movement direction in response to the rotation of the cam member,
    the first curved surface has a curved shape in the first cross-section, and
    the second curved surface has a curved shape in the first cross-section.

3. The actuator device according to claim 2, wherein
    the second curved surface extends about the rotational axis.

4. The actuator device according to claim 2, wherein
    the second curved surface spirally extends about the rotational axis.

5. The actuator device according to claim 2, wherein
    the cam member includes a cam groove defined by the second curved surface, and
    the first curved surface is at least partially provided in the cam groove in a state where the first curved surface is in contact with the second curved surface.

6. The actuator device according to claim 5, wherein
    the cam groove extends about the rotational axis.

7. The actuator device according to claim 5, wherein
    the cam groove spirally extends about the rotational axis.

8. The actuator device according to claim 5, wherein
    the cam groove includes a first end and a second end and extends from the first end to the second end, and
    the second curved surface extends from the first end to the second end.

9. The actuator device according to claim 2, wherein
    the first curved surface includes a convex curved shape.

10. The actuator device according to claim 2, wherein
    the second curved surface includes a concave curved shape.

11. The actuator device according to claim 2, wherein
    the movement direction is defined along the rotational axis.

12. The actuator device according to claim 2, wherein
    the cam follower includes an elongated part extending in the movement direction, and
    the elongated part includes an end portion including the first curved surface.

13. The actuator device according to claim 2, wherein
    the first curved surface includes a spherical surface, and
    the second curved surface is contactable with the spherical surface to move the cam follower in the movement direction in response to the rotation of the cam member.

14. The actuator device according to claim 2, wherein
    the first curved surface has a curved shape in a second cross-section perpendicular to a radial direction with respect to the rotational axis.

15. The actuator device according to claim 2, wherein
    the cam follower extends in the movement direction, and
    the cam follower includes an end portion including the first curved surface.

16. The actuator device according to claim 2, further comprising
    a base member, wherein
    the cam follower is movable relative to the base member in the movement direction, and
    the cam member is rotatable relative to the base member about the rotational axis.

17. The actuator device according to claim 2, further comprising
an electric actuator coupled to the cam member to rotate the cam member about the rotational axis.

18. A rider-posture changing apparatus for a human-powered vehicle, comprising:
a first member extending in a longitudinal direction;
a second member extending in the longitudinal direction, the first member and the second member being relatively movable in the longitudinal direction;
a state changing structure configured to change a state of the rider-posture changing apparatus; and
the actuator device according to claim 1, the actuator device being coupled to the state changing structure.

19. The rider-posture changing apparatus according to claim 18, wherein
the state changing structure is configured to change the state of the rider-posture changing apparatus between
a first state where the first member and the second member are restricted from moving relative to each other, and
a second state where the first member and the second member are relatively movable in the longitudinal direction.

20. An actuator device for a rider-posture changing apparatus of a human-powered vehicle, comprising:
a cam follower; and
a cam member rotatable about a rotational axis, at least one of the cam follower and the cam member including a curved surface contactable with another of the cam follower and the cam member to move the cam follower in a movement direction in response to a rotation of the cam member, the movement direction being different from a direction extending about the rotational axis,
the curved surface having a curved shape in a first cross-section along a plane extending along and radially outward from the rotational axis.

* * * * *